(12) United States Patent
Kassoumeh et al.

(10) Patent No.: US 11,275,843 B2
(45) Date of Patent: *Mar. 15, 2022

(54) INQUIRY RESPONSE MAPPING FOR DETERMINING A CYBERSECURITY RISK LEVEL OF AN ENTITY

(71) Applicant: SecurityScorecard, Inc., New York, NY (US)

(72) Inventors: Samuel Kassoumeh, New York, NY (US); Dolly Krishnaswamy, New York, NY (US); A. Robert Sohval, New York, NY (US)

(73) Assignee: SecurityScorecard, Inc., New York, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/703,464

(22) Filed: Dec. 4, 2019

(65) Prior Publication Data

US 2020/0285754 A1    Sep. 10, 2020

Related U.S. Application Data

(63) Continuation of application No. 16/294,688, filed on Mar. 6, 2019, now Pat. No. 10,546,135.

(51) Int. Cl.
    *G06F 21/57*   (2013.01)
    *G06N 20/00*   (2019.01)

(52) U.S. Cl.
    CPC .......... *G06F 21/577* (2013.01); *G06N 20/00* (2019.01); *G06F 2221/034* (2013.01)

(58) Field of Classification Search
    CPC combination set(s) only.
    See application file for complete search history.

(56) References Cited

U.S. PATENT DOCUMENTS

| | | |
|---|---|---|
| 7,254,569 B2 | 8/2007 | Goodman et al. |
| 8,914,419 B2 | 12/2014 | Gerard et al. |
| 9,363,251 B2 | 6/2016 | Morikuni et al. |
| 9,613,317 B2 | 4/2017 | Beamon et al. |
| 2012/0054592 A1 | 3/2012 | Jaffe et al. |
| 2013/0018652 A1 | 1/2013 | Ferrucci et al. |
| 2014/0358890 A1 | 12/2014 | Chen et al. |
| 2016/0173521 A1 | 6/2016 | Yampolskiy et al. |
| 2017/0053329 A1 | 2/2017 | Bowers |
| 2017/0195349 A1* | 7/2017 | Shabtai ............... H04L 63/1433 |
| 2018/0129813 A1 | 5/2018 | Dotson et al. |
| 2018/0129989 A1 | 5/2018 | Bowers |

* cited by examiner

*Primary Examiner* — Piotr Poltorak
(74) *Attorney, Agent, or Firm* — Norton Rose Fulbright US LLP

(57) ABSTRACT

The present disclosure provides a method, system, and device for inquiry response mapping for determining a cybersecurity risk level of an entity. To manage and/or evaluate a cybersecurity risk level based on a relationship between a first entity and a second entity, questionnaires (e.g., requests or inquires) are often exchanged between two entities. One or more aspects of the present disclosure provide populating data sets (e.g., questionnaires) indicative of risk level for the first entity or the second entity. One or more other aspects of the present disclosure further provide determining a cybersecurity risk level of an entity by mapping responses to a plurality of inquiry sets directed to the first entity or the second entity.

30 Claims, 21 Drawing Sheets

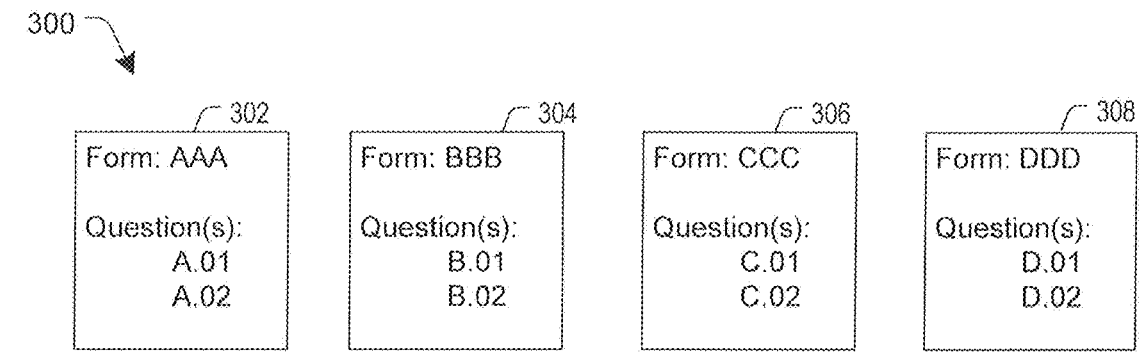
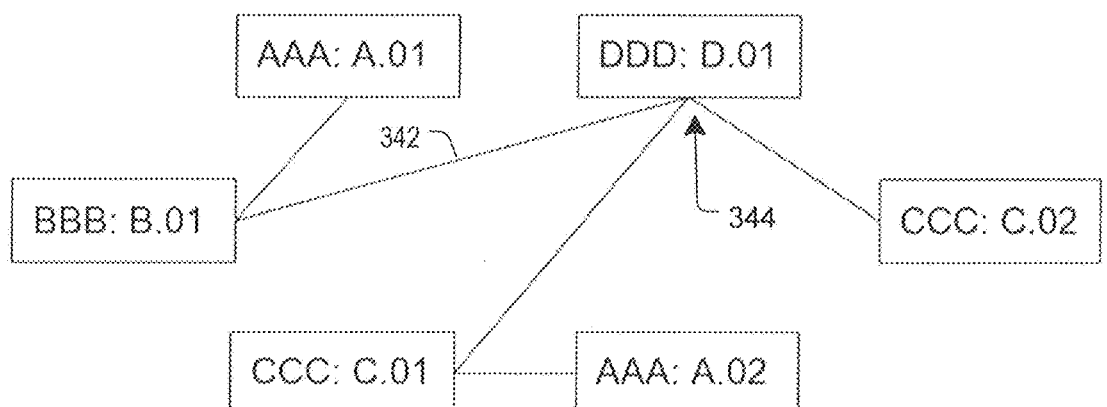
FIG. 3A
| | 382 | 384 | 386 | 388 | 390 |
|---|---|---|---|---|---|
| | Q.123 | Do you use firewall? | SIG.1, SIG.3, SIG.5 | NIST ID.AM-1, ID BE-3 | ISO 5.1, 6.1.2, 6.3 |
FIG. 3B

500

| Form | Q | Val | Form | Q | Val |
|---|---|---|---|---|---|
| AAA - M | A.01 | | CCC - M | C.01 | |
| AAA - M | A.02 | | CCC - M | C.02 | |
| BBB - M | B.01 | | DDD - M | D.01 | |
| BBB - M | B.02 | | DDD - M | D.02 | |

| Form | Q | Val | Form | Q | Val |
|---|---|---|---|---|---|
| AAA - M | A.01 | | CCC - M | C.01 | |
| AAA - M | A.02 | | CCC - M | C.02 | |
| BBB - M | B.01 | | DDD - M | D.01 | |
| BBB - M | B.02 | | DDD - M | D.02 | |
| BBB - R1 | B.01 | | | | |
| BBB - R1 | B.02 | | | | |

| Form | Q | Val | Form | Q | Val |
|------|---|-----|------|---|-----|
| AAA - M | A.01 | | CCC - M | C.01 | U1.D.01 |
| AAA - M | A.02 | | CCC - M | C.02 | U1.D.01 |
| BBB - M | B.01 | U1.D.01 | DDD - M | D.01 | U1.D.01 |
| BBB - M | B.02 | | DDD - M | D.02 | |
| BBB - R1 | B.01 | U1.D.01 | UPL1 | U1.D.01 | U1.D.01 |
| BBB - R1 | B.02 | | | | |

| Form | Q | Val | Form | Q | Val |
|------|---|-----|------|---|-----|
| AAA - M | A.01 | | CCC - M | C.01 | U1.D.01 |
| AAA - M | A.02 | | CCC - M | C.02 | U1.D.01 |
| BBB - M | B.01 | U1.D.01 | DDD - M | D.01 | U1.D.01 |
| BBB - M | B.02 | M1.B.B02 | DDD - M | D.02 | |
| BBB - R1 | B.01 | U1.D.01 | UPL1 | U1.D.01 | U1.D.01 |
| BBB - R1 | B.02 | M1.B.B02 | | | |

| Form | Q | Val | Form | Q | Val |
|---|---|---|---|---|---|
| AAA - M | A.01 | | CCC - M | C.01 | U1.D.01 |
| AAA - M | A.02 | | CCC - M | C.02 | U1.D.01 |
| BBB - M | B.01 | U1.D.01 | DDD - M | D.01 | U1.D.01 |
| BBB - M | B.02 | M1.B.B02 | DDD - M | D.02 | |
| BBB - R1 | B.01 | U1.D.01 | UPL1 | U1.D.01 | U1.D.01 |
| BBB - R1 | B.02 | M1.B.B02 | | | |
| CCC - R2 | C.01 | U1.D.01 | | | |
| CCC - R2 | C.02 | U1.D.01 | | | |

| Form | Q | Val | Form | Q | Val |
|---|---|---|---|---|---|
| AAA - M | A.01 | | CCC - M | C.01 | U1.D.01 |
| AAA - M | A.02 | | CCC - M | C.02 | U1.D.01 |
| BBB - M | B.01 | U1.D.01 | DDD - M | D.01 | U1.D.01 |
| BBB - M | B.02 | M1.B.B02 | DDD - M | D.02 | |
| BBB - R1 | B.01 | U1.D.01 | UPL1 | U1.D.01 | U1.D.01 |
| BBB - R1 | B.02 | M1.B.B02 | AAA - R3 | A.01 | |
| CCC - R2 | C.01 | U1.D.01 | AAA - R3 | A.02 | |
| CCC - R2 | C.02 | U1.D.01 | | | |

*FIG. 5F*

INQUIRY RESPONSE MAPPING FOR DETERMINING A CYBERSECURITY RISK LEVEL OF AN ENTITY

CROSS-REFERENCE TO RELATED APPLICATIONS

This application is a continuation of U.S. patent application Ser. No. 16/294,688 entitled "INQUIRY RESPONSE MAPPING FOR DETERMINING A CYBERSECURITY RISK LEVEL OF AN ENTITY," filed Mar. 6, 2019, the entire content of which is incorporated herein by reference in its entirety.

TECHNICAL FIELD

The present application is generally related to the technical field of cybersecurity technology, and more particularly, but not by way of limitation, to techniques for information exchange between entities to determine a cybersecurity risk level.

BACKGROUND

Security risks to an entity, such as a corporation, have become increasingly complex. Many threats to corporate information security, including those attributable to terrorism, organized crime, and/or individual hackers can be asymmetric, distributed, and/or networked, making cybersecurity risks more difficult to manage. Further, a corporation typically has one or more relationships (e.g., a customer/vendor relationship, a vendor/vendor relationship, a parent/subsidiary relationship, etc.) with other entities to provide and support services (e.g., software-as-a-service applications, etc.) for the corporation. Each of these relationships can impact a cybersecurity risk of the corporation (e.g., because the risk may be dependent upon not only the level of cybersecurity that the corporation has, but also on the level of cybersecurity that its relationship partners have). To manage and evaluate an impact of or vulnerability from a relationship, questionnaires (e.g., requests or inquires) are often exchanged between two entities. For example, a questionnaire may be used to determine another entity's compliance with an industry standard, evaluate the other entity's cybersecurity risk level, and determine an impact of the relationship on cybersecurity risk levels for each of the entities.

The exchange of questionnaires (e.g., inquires and/or requests) between two entities is often a time-consuming process. For example, questionnaires, such as a risk management questionnaire, generated and sent from a first entity (e.g., a sender) to a second entity (e.g., a responder) typically are in the form of a spreadsheet or the like. Such questionnaires are conventionally sent between entities via email. From the perspective of the responder, such questionnaires require a manual process of reviewing each question and inputting a response. The responder may receive multiple questionnaires from different entities that may have different file formats, different layouts, and different (yet overlapping) questions. As a result, the responder must give its undivided attention to an often repetitive process of responding to each questionnaire.

Additionally, providing supporting documents and/or evidence is cumbersome when the documents and/or evidence are sent as attachments to the questionnaire in an email. In some situations, communications involving the questionnaire and/or additional documents/evidence are unsecure. Further, providing comments or asking questions of the sender often occurs via email or phone such that feedback is not recorded in a responsive document itself.

From the perspective of the sender, it is difficult to track the questionnaires in different formats, some of which are returned with separate supporting documents and/or evidence, exacerbating the difficultly of also providing feedback and/or resolving discrepancies. Also, due to the time consuming nature of responding to and evaluating a questionnaire, responses to a completed/accepted questionnaire may become irrelevant and/or no longer accurate. In view of the foregoing, use of questionnaires to obtain information from another entity, such as a relationship partner, is a challenging endeavor for receiving reliable and timely information. Further, analysis of the information is also time consuming and tedious. Thus, it is often difficult to determine how a cybersecurity risk level of an entity and/or its relationship partner may be impacted or understood in view of the information.

BRIEF SUMMARY

Embodiments of the present disclosure provide systems, methods, and computer-readable storage media that provide inquiry response mapping for determining a cybersecurity risk level of an entity. For example, a cybersecurity assessment server (e.g., a cybersecurity assessment application) described herein is configured to manage and/or evaluate a questionnaire (e.g., a request or an inquires) for the entity and to determine a cybersecurity risk level based on the questionnaire. To illustrate, the questionnaire may be provided to the entity from a partner entity having a partner relationship with the entity. Based on responses to the questionnaire, a risk level of the entity is determined. Additionally, or alternatively, the determined risk level can be used to how the entity impacts the cybersecurity risk levels of the partner entity. From the perspective of the partner entity, the questionnaire can be provided to multiple entities to determine the partner entity's overall risk level, i.e., to the extent it is influenced by the cybersecurity risk levels of the responding business partners.

In some implementations, the server is configured to parse a questionnaire into a common format to standardize one or more forms and enable auto-filled responses using a set of response propagation rules. In addition, the server maintains data coherence and consistence among multiple questionnaires by generating a mapping of questions between multiple questionnaires and identifying potential conflicts. The sever also includes machine learning that prompts a user for feedback when a data conflict is detected and learns from the user's response to modify and improve the mapping and reduce future data conflicts. The server/application is further configured to model an impact of one questionnaire with respect to one or more other questionnaires and to determining a cybersecurity risk level of the entity based on the mapped responses. Thus, the server/application described herein enable reliable and timely information to be acquired from a cybersecurity questionnaire Additionally, the information from the questionnaire can be validated against cybersecurity data for the entity and can be utilized to determine a cybersecurity risk level of an entity.

Although one or more aspects of the systems, methods, and computer-readable storage media of the present disclosure are described within the context of cybersecurity, the disclosure is not to be limited to cybersecurity and cybersecurity risk assessment. For example, embodiments of the present provide systems, methods, and computer-readable storage media may provide inquiry response mapping independent of and/or without determining a cybersecurity risk level of an entity. To illustrate, the inquiry response mapping may be used in a variety of settings and/or circumstances in which multiple questionnaires received by an individual or entity may have overlapping questions. As an example, an individual seeking insurance may receive multiple applications (e.g., forms/questionnaires) from an insurance broker and/or from multiple insurance providers. As another example, a college applicant may receive applications for admission from multiple colleges. As a further example, an individual may receive questionnaires from medical professions that include questions regarding insurance, medical background, residence/address history information, employment history, etc. In other examples, a company may receive requests for proposals (RFPs) related to a service provided by the company. In such situations, systems, methods, and computer-readable storage media of the present disclosure enable the same or similar questions to be identified and/or responses of the same or similar questions to be auto-populate. Machine learning may also be used to improve response mapping and/or maintain response consistency as additional questionnaires are received, populated, and submitted.

According to one embodiment, a method for determining a cybersecurity risk level of an entity by mapping responses to a plurality of inquiry sets directed to the entity is described. The method includes reading, from a first inquiry set of the plurality of inquiry sets, responses from an entity to one or more inquiries in the first inquiry set, and determining a degree of similarity between the one or more inquiries in the first inquiry set and one or more inquiries in a second inquiry set of the plurality of inquiry sets. The method further includes modeling the responses and the determined degree of similarity to predict responses from the entity to one or more inquiries in the second inquiry set, and mapping, utilizing the prediction, responses from the entity to the one or more inquiries in the first inquiry set to the one or more inquiries in the second inquiry set. The method also includes calculating a cybersecurity risk level of the entity using responses from the entity to one or more inquiries in the first inquiry set and the mapped responses.

According to another embodiment, a computer program product includes a computer-readable storage device, such as a non-transitory computer-readable medium, includes instructions which, when executed by a processor of a computing system, cause the processor to perform the step of reading, from a first inquiry set of the plurality of inquiry sets, responses from an entity to one or more inquiries in the first inquiry set, and the step of determining a degree of similarity between the one or more inquiries in the first inquiry set and one or more inquiries in a second inquiry set of the plurality of inquiry sets. The medium also includes instructions which cause the processor to perform the step of modeling the responses and the determined degree of similarity to predict responses from the entity to one or more inquiries in the second inquiry set, and the step of mapping, utilizing the prediction, responses from the entity to the one or more inquiries in the first inquiry set to the one or more inquiries in the second inquiry set. The medium can also include instructions which cause the processor to perform the step of calculating a cybersecurity risk level of the entity using responses from the entity to one or more inquiries in the first inquiry set and the mapped responses.

According to yet another embodiment, an apparatus includes a memory and a processor coupled to the memory. The processor can be configured to execute the step of reading, from a first inquiry set of the plurality of inquiry sets, responses from an entity to one or more inquiries in the first inquiry set, and the step of determining a degree of similarity between the one or more inquiries in the first inquiry set and one or more inquiries in a second inquiry set of the plurality of inquiry sets. The processor can also be configured to execute the step of modeling the responses and the determined degree of similarity to predict responses from the entity to one or more inquiries in the second inquiry set, and the step of mapping, utilizing the prediction, responses from the entity to the one or more inquiries in the first inquiry set to the one or more inquiries in the second inquiry set. The processor can further be configured to execute the step of calculating a cybersecurity risk level of the entity using responses from the entity to one or more inquiries in the first inquiry set and the mapped responses.

According to one embodiment, a method for populating data sets indicative of risk level of a first entity having a relationship with a second entity is disclosed. The method includes receiving, by one or more processors, a first questionnaire from the first entity for the second entity. The first questionnaire includes a first question associated with first question data. The method further—includes performing, by the one or more processors, a matching operation between the first question data and second question data associated with a second question of a second questionnaire. The second questionnaire corresponds to the second entity. The method also includes, based on a result of the matching operation indicating a match between the first question data and the second question data, generating, by the one or more processors, a mapping between the first question and the second question. The method further includes in response to identification of a response to the second question provided by the second entity, populating, by the one or more processors based on the match between the first question data and the second question data, the first questionnaire with the response to the second question as a response to the first question on behalf of the second entity. The method includes providing to the first entity, by the one or more processors, the first questionnaire including the first question populated with the response from the second question.

According to another embodiment, a computer program product includes a computer-readable storage device, such as a non-transitory computer-readable medium, instructions which, when executed by a processor of a computing system, cause the processor to perform operations perform operations populating data sets indicative of risk level of a first entity having a relationship with a second entity. The operations include executing a first routine to receive a first questionnaire from the first entity for the second entity. The first questionnaire includes a first question associated with first question data. The operations further include executing a second routine to perform a matching operation between the first question data and second question data associated with a second question of a second questionnaire. The second questionnaire corresponds to the second entity. The operations also include based on a result of the matching operation indicating a match between the first question data and the second question data, executing a third routine to, generate a mapping between the first question and the second question. The operations further include in response to identification of a response to the second question provided by the second entity, executing a fourth routine to populate, based on the match between the first question data and the second question data, the first questionnaire with the response to the second question as a response to the first question on behalf of the second entity. The operations include executing a fifth routine to provide, to the first entity, the first questionnaire including the first question populated with the response from the second question.

According to yet another embodiment, an apparatus includes a memory and one or more processors coupled to the memory. The one or more processors are configured to receive a first questionnaire from the first entity for the second entity. The first questionnaire includes a first question. The one or more processors are further configured to perform a matching operation between the first question and a second question of a second questionnaire. The second questionnaire corresponds to the second entity. The one or more processors are also configured to, based on a result of the matching operation indicating a match between the first question and the second question, generate a mapping between the first question and the second question. The one or more processors are configured to, in response to identification of a response to the second question provided by the second entity, populate, based on the match between the first question and the second question, the first questionnaire with the response to the second question as a response to the first question on behalf of the second entity. The one or more processors are configured to provide, to the first entity, the first questionnaire including the first question populated with the response from the second question.

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which:

FIG. 3A includes examples of forms and examples of representations of mappings of the forms;

FIG. 3B includes an example of a static mapping of questions of multiple forms;

FIGS. 5A-5F illustrate different stages of response propagation;

DETAILED DESCRIPTION OF THE INVENTION

Figure 1:
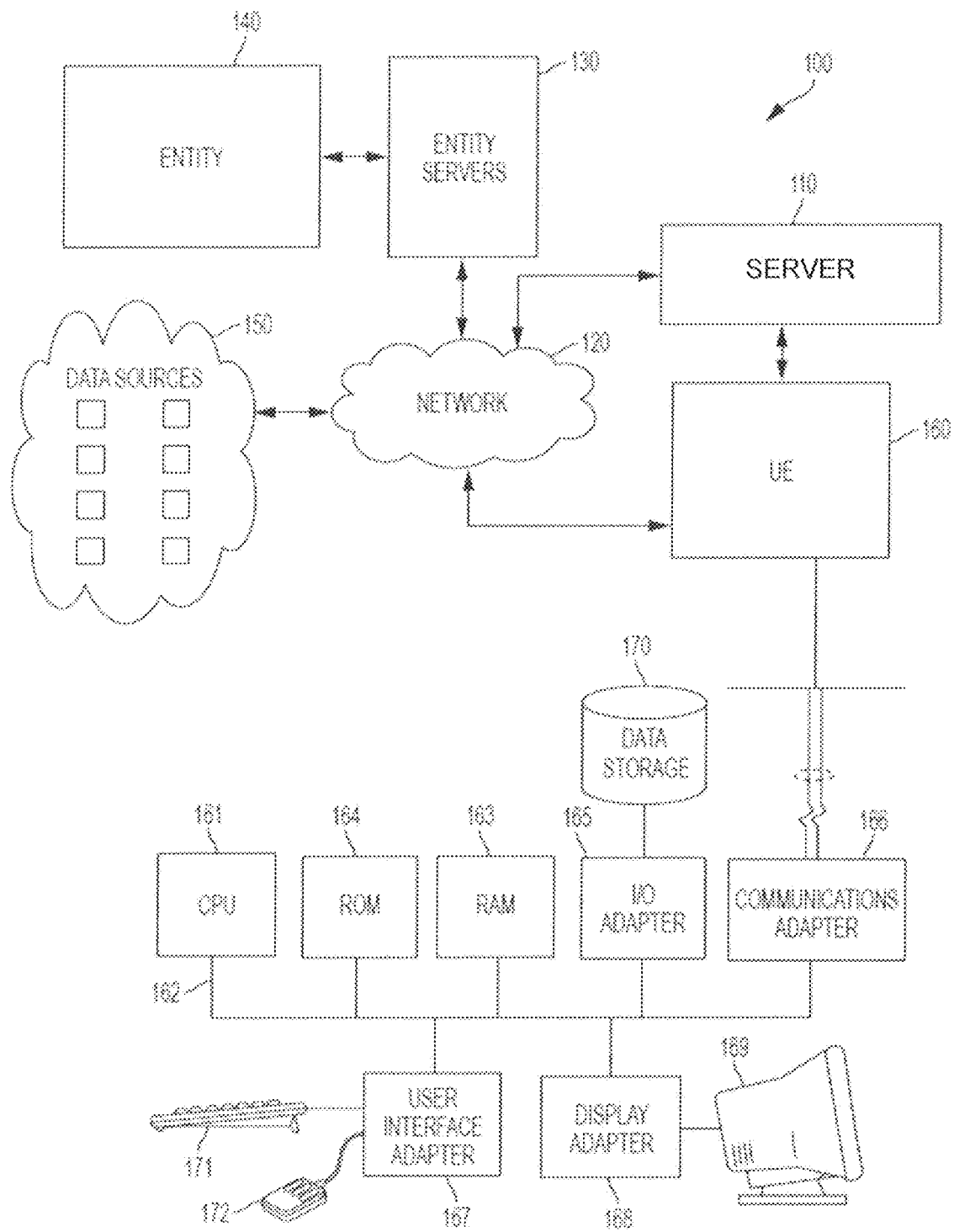
FIG. 1 is a block diagram of an example of a system that includes a server for mapping responses to one or more inquiry sets directed to the entity.

Inventive concepts utilize a system to determine a cybersecurity risk level of an entity by mapping responses to a plurality of inquiry sets directed to the entity. Once the risk level of the entity is determined, the determined risk level can be used to evaluate how it influences the cybersecurity risk levels of the entity's business partners. From another point of view, an entity can map responses provided in response to a plurality of inquiry sets directed to the entity's own partners to assess its overall risk level, i.e., to the extent it is influenced by the cybersecurity risk levels of the responding business partners. Based on an identified cybersecurity risk level of an entity, a business partner of the entity can modify one or more aspects of the business partner's relationship with the entity to reduce or eliminate a negative impact of the entity on the business partner. For example, when the cybersecurity risk level of an entity is particularly bad and exposes a business partner to cybersecurity threats, the business partner may cease the relationship with the entity. To illustrate, if the entity is a vendor of a service used by the business partner, the business partner may choose to no longer receive the service from the entity and may use a different entity for the service.

In some embodiments, the system is configured to match questions of multiple forms and generate a mapping (e.g., a many-to-many mapping) of the matched questions. The mapping enables auto-population of responses between the multiple forms with a benefit of time savings based on the automation and an increase in response consistency across the multiple forms. Accordingly, the system enables one or more previously completed questions and/or completed forms to be leveraged to complete additional forms. In some implementations, the completed forms can be used to determine a cybersecurity risk level of an entity. That is, a meaningful cybersecurity risk assessment can be performed and meaningful information can be derived from a timely and accurately completed form.

Embodiments also provide a set of parsing rules that can be applied when a new form is received to create the form in a common/standardized format. In addition, the system implements a set of response propagation rules for auto-population to maintain data coherence and consistence among multiple forms. In some implementations, an impact of mapping a completed form to one or more other forms is determined to enable a user to assess whether use of the completed form would be beneficial to advancing the one or more other forms or would result in one or more data conflict issues. The integrity of the data provided in responses to the forms enables efficient evaluation of a submitted form. In the event of identification of a conflict between responses of matched questions, a prompt is generated to request user feedback of how the user would like the issue resolved.

Embodiments also provide a cybersecurity category for each question and a mapping of questions based on a matched cybersecurity category. Accordingly, when a security issue is identified with respect to one or more questions, other questions may quickly and easily be identified that are also impacted by the security issue. The system can also provide ongoing insight into the objective nature of the questions even after completion of a form by comparing real-time cybersecurity data to responses of a completed form.

A machine learning model is utilized to identify corrections to data discrepancies and data conflicts. Additionally, or alternatively, the machine learning model is utilized to create and/or update a mapping of matched questions across multiple forms to improve response propagation between the forms. According to an embodiment, a machine learning model is trained over a time period where, during the training period, the system prompts the user for input and/or feedback to address identified conflict issues between questionnaires, responses of different questionnaires, and data propagation issues. In some implementations, the system may use fuzzy matching to match questions that have a determined similarity value greater than or equal to a threshold. As an illustrative, non-limiting example of the machine learning model, feedback regarding one or more identified matches may be used to adjust the threshold and improve identification of matched questions.

Embodiments also provide information and insight regarding a company's cybersecurity risk. For example, the system can generate and achieve reliable and timely questionnaires that can be used to evaluate cybersecurity risk levels of one or more companies, such as companies that have a relationship. The cybersecurity risk levels of a company can be used to classify a risk level of the company, provide a recommendation of one or more corrective actions to lower the cybersecurity risk level, calculate an overall cybersecurity risk score for the company, and/or generate an alert when the overall cybersecurity risk score exceeds a cybersecurity threshold. Additionally, the risk level of a company can be used to determine an industry cybersecurity percentile ranking for the company. Further still, the risk levels from multiple companies can be utilized to determine an aggregated calculated risk level for vendors for the company. A cybersecurity risk level can then be assigned to the company based on the aggregated calculated risk level for vendors for the company.

The foregoing features provide a system for inquiry response mapping for determining a cybersecurity risk level of an entity. This can be advantageous in a number of scenarios. For example, the inventive concepts and be utilized by a company to perform a cybersecurity risk assessment of one or more vendors of the company. The cybersecurity risk assessment may reveal and/or identify vendors that are having a negative impact on a company's overall cybersecurity score. Accordingly, the company and/or the vendors can take corrective actions to remedy identified issues and reduce cybersecurity risk levels.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

Referring to FIG. 1, a block diagram of network 100 that includes a server 110 (e.g., a cybersecurity assessment server), a communication network 120, an entity server 130, an entity 140, data sources 150, and user station 160 is shown. Server 110 may include one or more servers that, according to one embodiment, are configured to perform several of the functions described herein. One or more of the servers comprising server 110 may include memory, storage hardware, software residing thereon, and one or more processors configured to perform functions associated with network 100. For example, components comprising user station 160, such as CPU 162, can be used to interface and/or implement the server 110. Accordingly, user station 160 may serve as a cybersecurity risk assessment portal by which a user may access a cybersecurity risk assessment system disclosed herein. The portal can function to allow multiple users, inside and outside network 100 (e.g., at multiple instances of user station 160), to interface with one another.

One of skill in the art will readily recognize that different server and computer architectures can be utilized to implement server 110, and that server 110 is not limited to a particular architecture so long as the hardware implementing server 110 supports the functions of the cybersecurity risk assessment system disclosed herein.

Communication network 120 may facilitate communication of data between server 110 and data sources 150. Communication network 120 may also facilitate communication of data between server 110 and other servers/processors, such as entity server 130. Communication network 120 may include a wireless network, a wired network, or a combination thereof. For example, communication network 120 may include any type of communications network, such as a direct PC-to-PC connection, a local area network (LAN), a wide area network (WAN), a modem-to-modem connection, the Internet, intranet, extranet, cable transmission system, cellular communication network, a combination of the above, or any other communications network now known or later developed within the networking arts which permits two or more electronic devices to communicate.

Entity server 130 may include one or more servers which entity 140 uses to support its operations. In some embodiments, server 110 may access entity server 130 to collect information that may be used to calculate an entity's cybersecurity risk. Data sources 150 include the sources from which server 110 collects information to calculate and/or benchmark an entity's cybersecurity risk.

Entity 140 may include any individual, organization, company, corporation, department (e.g., government), or group of individuals. For example, one entity may be a corporation with thousands of employees and headquarters in New York City, while another entity may be a group of one or more individuals associated with a website and having headquarters in a residential home. In a particular implementation, entity 140 includes a business that has a domain and at least one user who can access server 110. For example, the user may access server 110 via an application, such as an application hosted by server 110. To illustrate, the user may have an account (e.g., on behalf of entity 140) and may log in to system 110 via the application, or may not have an account and access the application as a guest. In some implementations, to log in as a guest, the user first needs to receive an invitation, such as an invitation initiated by another entity and/or initiated by server 110 (e.g., the application). Although network 100 shows one entity 140, in other implementations, network 100 includes multiple entities. In a particular implementation, the multiple entities may include a first entity and a second entity, as describer further herein at least with reference to FIG. 2. In such implementations, the first entity may utilize server 110 to perform risk management assessment with respect to the second entity.

Data sources 150 may include any source of data accessible over communication network 120. By way of example, and not limitation, one source of data can include a website associated with a company, while another source of data may be an online database of various information. In general, data sources 150 may be sources of any kind of data, such as domain name data, social media data, multimedia data, IP address data, and the like. One of skill in the art would readily recognize data sources 150 are not limited to a particular data source, and that any source from which data may be retrieved may serve as a data source so long as it can be accessed via communication network 120.

With respect to user station 160, the central processing unit ("CPU") 161 is coupled to system bus 162. The CPU 161 may be a CPU or microprocessor, a graphics processing unit ("GPU"), and/or microcontroller that has been programmed to perform the functions of server 110. Embodiments are not restricted by the architecture of CPU 161 so long as CPU 161, whether directly or indirectly, supports the operations described herein. The CPU 161 is one component that may execute the various described logical instructions.

User station 160 also comprises random access memory (RAM) 163, which can be synchronous RAM (SRAM), dynamic RAM (DRAM), synchronous dynamic RAM (SDRAM), or the like. User station 160 may utilize RAM 163 to store the various data structures used by a software application. User station 160 may also comprise read only memory (ROM) 164 which can be PROM, EPROM, EEPROM, optical storage, or the like. The ROM may store configuration information for booting user station 160. RAM 163 and ROM 164 hold user and system data, and both RAM 163 and ROM 164 may be randomly accessed.

User station 160 may also comprise an input/output (I/O) adapter 165, a communications adapter 166, a user interface adapter 167, and a display adapter 168. The I/O adapter 165 and/or the user interface adapter 167 may, in certain embodiments, enable a user to interact with user station 160. In a further embodiment, display adapter 168 may display a graphical user interface (GUI) associated with a software or web-based application on a display device 169, such as a monitor or touch screen.

The I/O adapter 165 may couple one or more storage devices 170, such as one or more of a hard drive, a solid state storage device, a flash drive, a compact disc (CD) drive, a floppy disk drive, and a tape drive, to user station 160. Also, data storage 170 can be a separate server coupled to user station 160 through a network connection to I/O adapter 165. Communications adapter 166 can be adapted to couple user station 160 to a network, which can be one or more of a LAN, WAN, and/or the Internet. Therefore, in some embodiments, server 110 may be accessed via an online portal. User interface adapter 167 couples user input devices, such as a keyboard 171, a pointing device 172, and/or a touch screen (not shown) to the user station 160. The display adapter 168 can be driven by CPU 161 to control the display on display device 169. Any of devices 161-168 may be physical and/or logical.

The concepts described herein are not limited to the architecture of user station 160. Rather, user station 160 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user station 160, or certain components thereof, may reside at, or be installed in, different locations within network 100.

In some implementations, server 110 can comprise a server and/or cloud-based computing platform configured to perform operations and/or execute the steps described herein. Accordingly, server 110 may include a particular purpose computing system designed, configured, or adapted to perform and/or initiate operations, functions, processes, and/or methods described herein and can be communicatively coupled with a number of end user devices (e.g., user station 160), which can be, e.g., a computer, tablet, Smartphone, or other similar end user computing device. Users can interact with server 110 using a device via one or more networks, such as network 120, which itself can comprise one or more of a local intranet, a LAN (Local Area Network), a WAN (Wide Area Network), a virtual private network (VPN), and the like. As will be apparent to those of skill in the art, communicative coupling between different devices of network 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
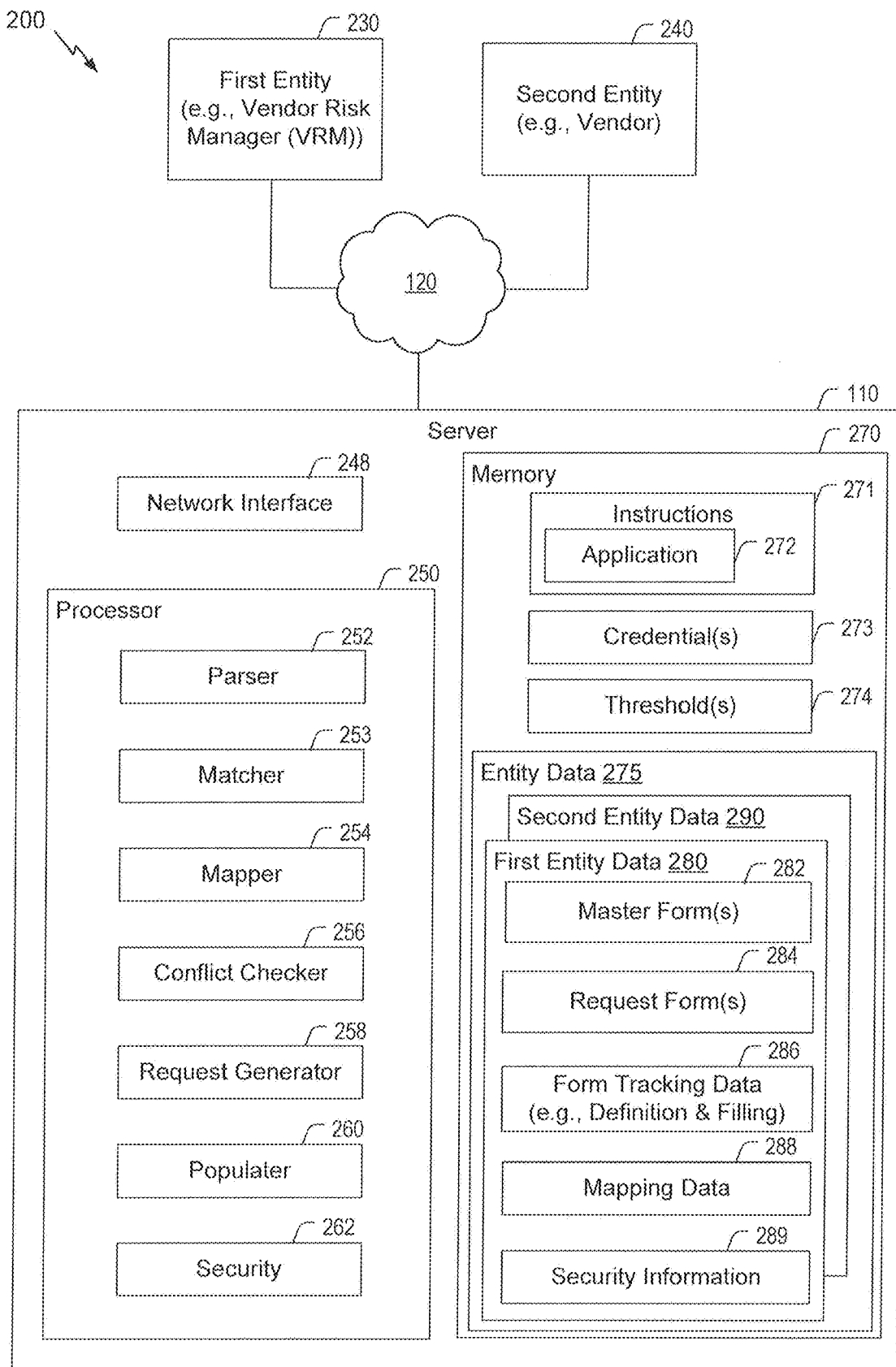
FIG. 2 is a block diagram of another example of a system for mapping responses to one or more inquiry sets directed to the entity.

Referring to FIG. 2, a block diagram of a system (e.g., a network) for cybersecurity assessment according to an embodiment is shown as a system 200. System 200 may include or correspond to at least a portion of network 100. System 200 includes server 110, communication network 120, a first entity 230, and a second entity 240.

Each of first entity 230 and second entity 240 may include or correspond to entity 140. In some implementations, first entity 230 and 240 may have a relationship. Additionally or alternatively, first and second entities 230, 240 may be portions (e.g., subsidiaries) of the same entity and/or company, or may be separate and/or distinct entities. It is noted that each of first and second entity 230, 240 may include one or more corresponding servers (e.g., 130) (not shown).

Server 110 may include a network interface 248, one or more processors 250, and a memory 270 (e.g., one or more memory device). Network interface 248 may be configured to be communicatively coupled to one or more external devices, such as an electronic device associated with first entity 230, an electronic device associated with second entity 240, and/or another device, via one or more networks (e.g., 120). For example, network interface 248 may include a transmitter, a receiver, or a combination thereof (e.g., a transceiver).

Processor 250 may include may be a CPU (e.g., CPU 162) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an embodiment, server 110 (e.g., processor 250) may comprise a parser module 252, a matcher module 253, a mapper module 254, a conflict checker module 256, a request generator module 258, a populater module 260, and a security module 262. In an embodiment, server 110 (e.g., processor 250 or modules 252, 253, 254, 256, 258, 260, 262) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

Memory 270 includes (e.g., is configured to store) instructions 271, one or more credentials 273, one or more threshold 274, and entity data 290. For example, memory 270 may store instructions 271, that when executed by the one or more processors 250, cause the processor(s) 250 to perform functions, methods, processes, operations as described further herein. In some implementations, instructions 271 may include or be arranged as an application 272 (e.g., a software program) associated with cybersecurity risk assessment. For example, application 272 may provide a portal via which one or more entities and/or users interact with and access server 110. In some implementations, memory 270 includes multiple memories accessible by processor 250. In some such implementations, one or more of the memories may be external to server 110. To illustrate, at least one memory may include or correspond to a database accessible to server, such as a database that stores entity data 275.

In some implementations, one or more of modules (e.g., 252, 253, 254, 256, 258, 260, 262) may locally reside in memory 270 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Credentials 272 include login information to enable one or more users and/or one or more entities to access server 110. For example, credentials 272 may include a first credential for a first user of first entity 230 and a second credential for a second user of the second entity 240. One or more thresholds 274 may include one or more security level thresholds, one or more time thresholds, one or more other thresholds, or a combination thereof.

Entity data 275 may include data associated with one or more entities. For example, the data may be associated with cybersecurity risk assessment of one or more entities, such as first entity 230 and/or second entity 240. To illustrate, entity data 275 includes first entity data 280 associated with first entity 230 and second entity data 290 associated with second entity 240. For example, first entity data 280 includes one or more master forms 282, one or more request forms 284, form tracking data 286, mapping data 288, and security information 289. Second entity data 290 may include similar data as described with reference to first entity data 280.

The one or more master forms 282 include a questionnaire (e.g., an inquiry, a survey, a request, an audit, etc.) based on one or more standards associated with and/or applicable to first entity 230. For example, the International Organization for Standardization (ISO) defines a standard as "a document, established by consensus and approved by a recognized body that provides, for common and repeated use, rules, guidelines, or characteristics for activates or their results, aimed at the achievement of the optimum degree of order in a given context." International Organization for Standardization/International Electrotechnical Commission (2004), *ISO/IEC Directives Part* 2:2004 (Rules for the Structure and Drafting of international Standards), 5th ed. In some implementations, a master form (e.g., 282) may be based on or correspond to a standard determined and/or set by a standard setting organization. Additionally, or alternatively, a master form (e.g., 282), such as a questionnaire, may be generated as a custom master form (e.g., a custom questionnaire) by first entity 230, second entity 240, another entity, or server 110, such as an application hosted by server 110 or an administrator of server 110. In some implementations, master forms 282 may include, for each of one or more standards, a single active version of a master form and one or more inactive versions of the master form, such as one or more previous versions of the master form. One or more questions of a master form 282 may be populated with one or more responses (e.g., one or more answers) provided on behalf of first entity 230.

In some implementations, a standard may be a cyber security standard that defines both functional and assurance requirement within a product, system, process, or technology environment. Cyber security standards can cover a broad range of granularity, from mathematical definition of a cryptographic algorithm to a security features in a web browser. Additionally, requirements of a cyber security standard need to be able to be assessed and verified even when a product, system, process, or technology environment is in operation. Illustrative, non-limiting examples of a cybersecurity standard include National Institute of Standards and Technology (NIST) standards (e.g., NIST CSF (Cybersecurity Framework)), International Organization for standardization (ISO) and the International Electrotechnical Commission (IEC) ISO/IEC 2700 standards (e.g., ISO/IEC 27001:2013—Information technology—Security techniques—Information security management systems—Requirements), Consortium for IT Software Quality (CISQ) standards, Standard of Good Practice (SoGP) provided by Information Security Forum (ISF), North American Electric Reliability Corporation (NERC) standards (e.g., NERC CIP, NERC 1300), ISO 15408 ("Common Criteria"), RFC 2196, ANSI/ISA 62443 (Formerly ISA-99), IEC 62443, or IASME Governance standards.

In some implementations, a master form 282 operate as a source and/or definition document of an entity. For example, when first entity 230 is a company, a first master form may include leadership information of the company, such as CEO information, board of directors information, etc. As another example, a second master form of the company may be directed to personnel information including number of employs, diversity statistics, etc. As another example, when first entity is an individual, a first master form may include insurance information, a second master form may include medical history information, a third master form may include address information, a fourth mater form may include employment history, etc.

The one or more request forms 284 include a request form, such as a questionnaire(s) (e.g., an inquiry), that have been received, for first entity 230, from second entity 240, another entity, or server 110 (e.g., application 271). For example, first entity 230 may upload a request form, such as a blank request form (e.g., questions but no responses), a request form with one or more answers provided on behalf of first entity 230, or a request form with one or more answers provided on behalf of second entity 240 or another entity. Additionally, or alternatively, the one or more request forms 284 include a request form, such as a questionnaire(s) (e.g., an inquiry), that has been generated at the request of first entity 230 and/or server 110 (e.g., application 270) to be provided to second entity 240 and/or another entity. A request form generated at the request of first entity 230 and/or server 110 (e.g., application 270) may be based on a master form (e.g. 282) such that the request form (e.g., 284) includes one or more questions of the master form (but not the responses of the master form).

Form tracking data 286 includes tracking data to maintain and manage the one or more master forms 282, the one or more request forms 284, or both. Form tracking data 286 may include or be arranged as one or more data structures, such as a table. Additionally, or alternatively, form tracking data 286 may include metadata of a particular form, an index, etc., to enable server 110 to arrange, organize, and manage entity data 275 (e.g., first entity data 280). Although described as separate from each of the one or more master forms 282 and the one or more request forms 284, in other implementations, at least a portion of form tracking data 286 may be included in the one or more master forms 282, the one or more request forms 284, or both.

Additionally, or alternatively, form tracking data 286 may indicate whether a form is a definition type or a filling type. For example, server 110 (e.g., application 271) may be configured to represent a form as one of multiple entity structures, such a definition type which represents a framework/structure of a form and a filing type which represents an instance of a form. For each standard there is only one definition type form. However there can be an arbitrary number of filling type forms for that standard. An example of each of a definition type for and a filling type form are described further herein at least with reference to FIG. 4. In some implementations, a designation of definition type or from type for a form may be indicated as a suffix to the form, such as an extension to a filename of the form.

In some implementations, the definition type form may include a definition subtype, such as a system subtype or a custom subtype. The system subtype indicates a form represents a framework/structure applicable to multiple entities, such as a regional framework/structure or a global/world-wide framework/structure. For example, a form having a definition type and a system subtype may be maintained by server 110 (e.g., application 271) and instances of the form having a filling type may be provided to entities for use as a master form. To illustrate, server 110 may store a form having a definition type and system subtype at memory 270 and may provide a first instance (e.g., a copy) of the form having a filling type to first entity data 280 for storage as a master form 282 and provide a second instance of the form having a filling type to second entity data 290 for storage as a master form within second entity data 290.

The custom subtype indicates a form represents a framework/structure that is specific to a particular entity. A form having a definition type and a custom subtype (specific to a particular entity) may be stored at a portion of entity data 275 associated with the particular entity. For example, a form having a definition type and a custom subtype specific to first entity 230 may be stored at first entity data 280 as a master form 282. A request form generated based on the form having a definition type and a custom subtype may have a filling type and may be provided to second entity such that the request form having the filling type is stored at second entity data 290 as a request form (e.g., 284).

When a first form having a definition type is modified or updated, a new version of the first form, such as a second form having a definition type, is generated and can be set to active. Setting the second form to active causes the first form to be set to inactive. In such a situation, existing forms having the filling type, and that based on the first form, are maintained and remain the same, but new fillings will be generated based on the second form (which is active) and will reflect the changes made to the first form. By maintaining (and not updating) the existing forms having the filing type, and that based on the first form, data correspondence is maintained between a form having a definition type and each of one or more forms (having a filling type) generated based on the form (having the definition type).

Mapping data 288 may include one or more data structures that map questions from one form to another form. The one or more data structures may include a table or a node-edge map, as illustrative, non-limiting examples. In some implementations, the forms used to generate a map may include and/or be limited to master forms. Additionally, or alternatively, mapping data may include, for a particular question, a static mapping to matching questions of one or more other forms.

Security information 289 may include cybersecurity risk information for first entity 230, second entity 240, and/or one or more other entities. For example, security information 289 may include cybersecurity scores using one or more of the techniques described in commonly-owned U.S. patent application Ser. No. 14/702,661, entitled "CALCULATING AND BENCHMARKING AN ENTITY'S CYBERSECURITY RISK SCORE," and commonly-owned U.S. patent application Ser. No. 15/663,541, entitled "REDUCING CYBERSECURITY RISK LEVEL OF A PORTFOLIO OF COMPANIES USING A CYBERSECURITY RISK MULTIPLIER," the content of each of which is incorporated herein by reference in its entirety.

Referring to processor 250, parser module 252 may comprise one or more routines, executable by one or more processors (e.g., the CPU 161 of FIG. 1) or processor 252 to identify, classify, copy, organize, and/or arrange data from a first format of a file to a second format of the file. Parser module 252 may include multiple parsers and each parser is configured to parse a specific format into a second specific format. Parser module 252 is configured to parse a received file and to identify one or more types of information, such as information corresponding to form definition 400 and form filling 500, as described further herein with reference to FIG. 4. Parsed information generated by parser module 252 may be provided to one or more of the other modules described herein.

Matcher module 253 may comprise one or more routines, executable by one or more processors (e.g., the CPU 161 of FIG. 1) or processor 252 to perform one or more matching operations. For example, matcher module 253 may match question codes, question text, response(s), or a combination thereof, as illustrative, non-limiting examples Matcher module 253 may be configured to perform an exact match determination between questions of the same form and/or questions of different forms. As another example, matcher module 253 may also be configured to perform fuzzy mating between questions of the same form and/or questions of different forms. To illustrate, matcher module 253 may perform a fuzzy match (with a percentage) and, if the percentage is greater than or equal to a threshold (e.g., 274), a match is indicated as detected. In some implementations, matcher module 253 is configured to provide an output that indicates a detected match to mapper module 254 and/or conflict checker module 256. Additionally, or alternatively, mapper module 254 may be configured to match categories (e.g., security categories, question/information type categories, etc.) of questions of multiple forms.

Mapper module 254 may comprise one or more routines, executable by one or more processors (e.g., the CPU 161 of FIG. 1) or processor 252 to map matches detect by matcher module 253. In some implementations, mapper module 254 is configured to perform a mapping operation responsive to an indication from conflict checker module 256 that no conflict is present and/or responsive to a user input to proceed with the mapping. Mapper module 254 may be configured to generate a many-to-many mapping in which as many mappings as possible are identified. Additionally, or alternatively, mapper module 254 may be configured to generate a mapping of categories (e.g., security categories) of questions, such as questions of multiple master forms. In some implementations, a security category mapping may be utilized to identify areas of concern in response to detection of a cybersecurity risk.

Conflict checker module 256 may comprise one or more routines, executable by one or more processors (e.g., the CPU 161 of FIG. 1) or processor 252 to identify inconsistencies in responses of matched and/or mapped questions. For example, conflict checker module 256 may be configured to identify when two matched questions have different response types—e.g., a first question has a Y/N response type and a second question has a 0-10 response type. Additionally, or alternatively, conflict checker module 256 may be configured to identify when two matched questions have conflicting response—e.g., a first question has "Y" for a Y/N response type and a second question has "N" for a Y/N response type. As another example, conflict checker module 256 may identify potentially conflicting responses between different response types of two matched questions—e.g., for a matched question of "Are you happy", a first question has "Y" for a Y/N response type and a second question has "5" for a response type 0-10, where 0 is unhappy and 10 is happy.

Request generator module 258 may comprise one or more routines, executable by one or more processors (e.g., the CPU 161 of FIG. 1) or processor 252 to generate a request form. To illustrate, request generator module 258 may be configured to generate a request form (having a form filling type) from another form having a definition type. In some implementations, request generator module 258 may be configured to generate a request form (having a form filling type) from a first portion of a first form having a definition type and a second portion of a second form having a definition type.

Populater module 260 may comprise one or more routines, executable by one or more processors (e.g., the CPU 161 of FIG. 1) or processor 252 to propagate responses from one form to another form based on a detected match, a mapping, and/or a determination that no conflict has been identified. To illustrate, based on a detected match between two questions (one of which is a question of a master form), populater module 260 will populate a response for one question into the response for the question of the master form in response to a determination that the response of the master form is blank. A determination that the response to the master form is blank may be determined by the conflict checker module 256. Additionally, or alternatively, when a response to question of a master form is input/propagated, all request forms related to that master may be updated. In some implementations, one or more request forms may not be updated or may have a delayed update based on a status of the request.

Security module 262 may comprise one or more routines, executable by one or more processors (e.g., the CPU 161 of FIG. 1) or processor 252 to determine gather and/or determine security information. For example, security module 262 may include one or more modules as described with reference to commonly-owned U.S. patent application Ser. No. 14/702,661, entitled "CALCULATING AND BENCHMARKING AN ENTITY'S CYBERSECURITY RISK SCORE," and commonly-owned U.S. patent application Ser. No. 15/663,541, entitled "REDUCING CYBERSECURITY RISK LEVEL OF A PORTFOLIO OF COMPANIES USING A CYBERSECURITY RISK MULTIPLIER," the content of each of which is incorporated herein by reference in its entirety. In some implementations, security module 262 may be configured to validate information (e.g., responses) included in one or more master forms (e.g., 282).

To illustrate, when entity 230 is an individual and a master form corresponds to employment history information of the individual, security module 262 may validate one or more responses included in the master form based on information intrusively collected and/or non-intrusively collected on the individual.

Based on uses of a many to many mapping, multiple data conflicts may occur if a response is propagated to for all mapped questions. To illustrate, data conflict may include overwriting valid data with expired data, propagating an unacceptable response type to a particular question, because of many to many, and combining inconsistent responses into a single response, as illustrative, non-limiting examples. To reduce and/or eliminate data conflicts, propagator module 256 may be configured to propagate a response based on a match with a question of a master form a mapped distance of one hop from the matched question of the master form. To propagate a response beyond one hop, a user may be prompted to approve the additional propagation and/or to resolve identified data conflicts. The feedback provided from the prompts may be utilized by machine learning to improve data conflict detection, data conflict resolution, match detection, propagation distance, and automatic propagation. To illustrate, processor 250 and/or one or more modules of modules 252-262 may include a machine learning component and/or execute a machine learning algorithm. For example, processor 250 and/or one or more modules of modules 252-262 may prompt and/or monitor for user input to "learn" by, e.g., identifying patterns, categories, statistical relationships, etc. The result of the learning is then used to monitor whether new data exhibits the same patterns, categories, statistical relationships.

Additionally, it is noted that if matcher module 253 detects a question map, responses are mapped independently. To illustrate, for master forms AAA having question A.01, BBB having question B.01, and DDD having questions D.01, each of questions A.01 and D.01 may be directly mapped to question B.01, but not directly mapped to each other. In a first situation, B.01 may have responses Yes/No, 1-5, and Text; A.01 may have responses Yes/No and Text; D.01 may have responses 1-5 and Text. When in situation 1, to populate Yes/No response in B.01, the Yes/No from A.01 will be used, and to populate 1-5 response in B.01, the 1-5 response from D.01 will be used to populate. For filling text response in B.01, there are two candidates as each of A.01 and D.01 have text. If A.01 and D.01 have filled in Text response, it is uncertain which question will be used by populater module 260 to populate text response in B.01. In such a situation, conflict checker module 256 may identify the situation and initiate a prompt for user input to identify a preference between A.01 and D.01 and/or to resolve any data inconsistency/mismatch between the text response of A.01 and the text response of D.01. Machine learning associated with one or more of matcher module 253, mapper module 254, conflict checker module 256, and populater module 260 may identify and learn based on the user input. For example, based on a response to the prompt that indicates a preference for A.01, the machine learning may remove the mapping between question B.01 and D.01. In such a situation, B.01 may retain the 1-5 response from D.01 or may not be populated with 1-5 response from D.01. In some implementations, a determination of whether or not to populate B.01 with the 1-5 response from D.01 may be received responsive to a prompt or may be based on machine learning of one or more previous responses to similar conflict situations.

In a second situation, B.01 has responses Yes/No and Text; A.01 has Yes/No and Text—Yes is filled and Text is empty; and D.01 has Yes/No and Text—No is filled and Text is not empty. In the second situation, when a match is found between B.01 and A.01 or between B.01 and D.01, there may be no certainty of in which order questions are mapped. For example, if A.01 is found first, then it will populate Yes into B.01; then, when D.01 is found, it cannot populate No since B.01 is already filled in with Yes. However, D.01 is able to populate its Text response to B.01. Accordingly, situation 2 would lead to situation where B.01 has response Yes (from A.01) and text (from D.01) which was part of No response, thereby creating a data consistency issue. In such a situation, conflict checker module 256 may identify the situation and initiate a prompt for user input to resolve the data inconsistency at B.01 and/or between A.01 and 0.01, provide a preference between A.01 and D.01 to populate B.01, or a combination thereof. Machine learning associated with one or more of matcher module 253, mapper module 254, conflict checker module 256, and populater module 260 may identify and learn based on the user input. For example, based on a response to the prompt indicating that D.01 is to be used for B.01, the machine learning may identify a preference of form DDD over form AAA for further conflicts and may update A.01 to be consistent with D.01.

In a third situation, a user (e.g., an entity) may create a custom form that is similar to a form for a standard. To illustrate, a standard 1 may have questions QA, QB, QC; a standard 2 may have questions QC, QD, QE; and the custom form may have questions QC, QD, QE. Because matched questions are processed independently, if the custom form is provided to an entity that has completed standard 1 and standard 2, QD and QE of the custom will be populated from standard 2, but it is unknown whether QC will be populated from standard 1 or standard 2. In such a situation, conflict checker module 256 may identify the situation and initiate a prompt for user input to identify a preference to populate QC of the custom for with QC from standard 1 or standard 2. Machine learning associated with one or more of matcher module 253, mapper module 254, conflict checker module 256, and populater module 260 may identify and learn based on the user input. For example, based on a response to the prompt indicating a preference/priority between standard 1 and standard 2, machine learning may resolve further conflicts between standard 1 and standard 2 in a similar manner.

As seen with the examples described above for each of situations 1-3, machine learning can be used to update and/or train mapper module 254 to update one or more mappings to avoid and/or resolve conflict. Additionally, or alternatively, machine learning can be used to update and/or train conflict checker module 256 to resolve subsequent issues without additional user feedback.

During operation of system 200, with respect to first entity 230, matcher module 253 and mapper module 254 may operate to generate mapping data 288 for multiple master forms 282. For example, matcher module 253 may detect one or more question matches and mapper module 254 may generate mapping data 288 based on the detected matches.

First entity 230 may receive a request form (e.g., 284) from second entity 240. In response to receipt of the request form, matcher module 253 may detect whether one or more questions of the request form match one or more questions of master forms 282, request forms 284, or both. In response to detection of a detected match, conflict checker module 256 may determine whether a conflict exists based on the match. If a conflict is present, conflict checker module 256 may resolve the conflict or may prompt a user of first entity 230 for input to resolve the conflict. If no conflict is identified for a detected match, populater module 260 may populate one or more responses to the request from based on mapping data 288.

In some implementations, a user of first entity 230 may provide a file with at least one question having a response. Parser module 252 may identify a format of the file and determine whether the file needs to be parsed to be utilized by system 200. If the file needs to be parsed, then parser module 252 parses the file. Alternatively, if the file does not need to be parsed, parser module 252 does not parse the file. Next, matcher module 253 identifies one or more questions of the file and determines whether a match is detected between the one or more questions of the file and any of master forms 282, request form 284, and the request form from second entity 284. If a match is detected, conflict checker module 256 determines whether or not any conflicts exist between responses of the file and any of master forms 282, request form 284, and the request form from second entity 284. Additionally, for questions in which no conflict is present, populater module 260 determines/identifies which questions may have responses populated/updated based on the detected match. In some implementations, a user of first entity 230 may be presented with a proposed impact (e.g., a model result) of file on master forms 282, request form 284, and the request form from second entity 284. Additionally, populater module 260 may populate one or more responses from the file to master forms 282, request form 284, and the request form from second entity 284 based on mapping data 288. Based on the request form populated with one or more response from the file, security module 262 may identify one or more cybersecurity categories associated with questions of the request form and may determine a cybersecurity risk level of the entity using one or more responses of the request form. The user of the first entity 230 may indicate that the request form is complete and the completed request form may be provided to the second entity 240.

Referring to FIGS. 3A and 3B, examples of forms and examples of representations of mappings of the forms are shown. To illustrate, referring to FIG. 3A, a set of forms is shown and generally designated 300, a first mapping is shown and generally designated 320, and a second mapping is shown and generally designated 340. First mapping 320 and second mapping 340 may be generated by parser module 252, matcher module 253, mapper module 254, and/or conflict checker module 256. Referring to FIG. 3B, an example of a static mapping of a question is shown and generally designated 380.

The set of forms 300 (e.g., a set of one or more questionnaires/a set of one or more inquiries) may correspond to an entity, such as first entity 230 or second entity 240. For example, in a particular implementation, set of forms 300 includes one or more master forms 282, one or more request forms 284, or a combination thereof. In a particular implementation, each form of the set of forms 300 is a master form (e.g., 282), such as a system form, that corresponds to different standard.

As shown, the set of forms 300 includes a first form 302, a second form 304, a third form 306, and a fourth form 308. First form 302 includes a form identifier "AAA" (e.g., form AAA) and questions A.01 and A.02. Second form 304 includes a form identifier "BBB" (e.g., form BBB) and questions B.01 and B.02. Third form 306 includes a form identifier "CCC" (e.g., form CCC) and questions C.01 and C.02. Fourth form 304 includes a form identifier "DDD" (e.g., form DDD) and questions D.01 and D.02. In a particular implementation, first form 302 corresponds to a SIG standard, second form 304 corresponds to a NIST standard, third form 306 corresponds to an ISO standard, and fourth form 308 corresponds to a custom standard.

Each of first mapping 320 and second mapping 340 represents the same mapping between the set of forms 300. For example, first mapping 320 and second mapping 340 may include or correspond to mapping data 288 and/or may be generated by mapper module 254. First mapping 320 is represented as a table and second mapping 340 is represented as an edge-node map. For example, first mapping 320 includes columns having headings: Source—Std; Source—Question; Target—Std; and Target—Question. First mapping 320 also includes one or more entries that map questions of master forms (e.g., 302, 304, 306, 308) to questions of other master forms. For example, a first entry indicates that question A.01 of first form 302 (having form identifier AAA) maps to question B.01 of second form 304 (having form identifier BBB).

As an illustrative, non-limiting example, to generate first mapping 340, first form 302 (AAA) was selected and second form 304 (BBB) was matched to first form 302 to detect one or more matches. Question B.01 was detected as a match to question A.01 and the two questions were mapped. Next, third form 306 (CCC) was selected and matched to each of first form 302 (AAA) and second form 304 (BBB). Question C.01 was detected as a match to question A.02 and the two questions were mapped. Next, fourth form 308 (DDD) was selected and matched to each of first form 302 (AAA), second form 304 (BBB), and third form 306 (CCC). Question D.01 was detected as a match to each of questions B.01, C.01, and C.02, and each matched pair of questions was mapped.

Referring to second mapping 340, vertices corresponds to questions of different forms (e.g., 302, 304, 306, 308) and edges correspond to a mapping. For example, vertex 344 corresponds to question D.01 of fourth form 308 (DDD) and edge 342 indicates that question D.01 maps to question B.01 of second form 304 (BBB).

Referring to FIG. 3B, static mapping 380 represents an example of a mapping from a master form master having a question Q.123—"Do you use firewall?". For example, static mapping 380 may include or correspond to mapping data 288 and/or may be generated by mapper module 254. The master form having the question Q.123 may include a custom master form. The static mapping 380 may be generated to map the question Q.123 to questions of one or more other master forms. To illustrate, static mapping 380 includes multiple fields 382, 384, 386, 388, 390. First field 382 identifies question Q.123 and second field 384 indicates a text of question Q.123. that are determined to match question Q.123. Each of third field 386, fourth field 388, and fifth field 390 corresponds to a different master form for a different standard. To illustrate, third field 386 corresponds to a master form for a SIG standard, fourth field 388 corresponds to a master form for a NIST standard, and fifth field 390 corresponds to a master form for a ISO standard. The static mapping 380 indicates that question Q.123 maps to SIG.1, SIG.3, SIG.5, ID.AM-1, ID.BE-3, ISO 5.1, ISO 6.1.2, and ISO 6.3. For the static mapping we can also determine a relational ("hop") distance between Q.123 and SIG.1 is 1 (hop) and that a distance between ISO 5.1 and ISO 6.1.2is 2 hops—(ISO 5.1→Q.123→ISO 6.1.2).

Thus, FIGS. 3A and 3B illustrate forms and examples of representations of mappings of the forms. The mappings of forms described with reference to FIGS. 3A and 3B may be utilized by server 110 to populate data sets indicative of risk level of a first entity having a relationship with a second entity. Additionally, or alternatively, the mappings may be utilized by server 110 to determine a cybersecurity risk level of an entity by mapping responses to a plurality of inquiry sets directed to the entity.

Figure 4:
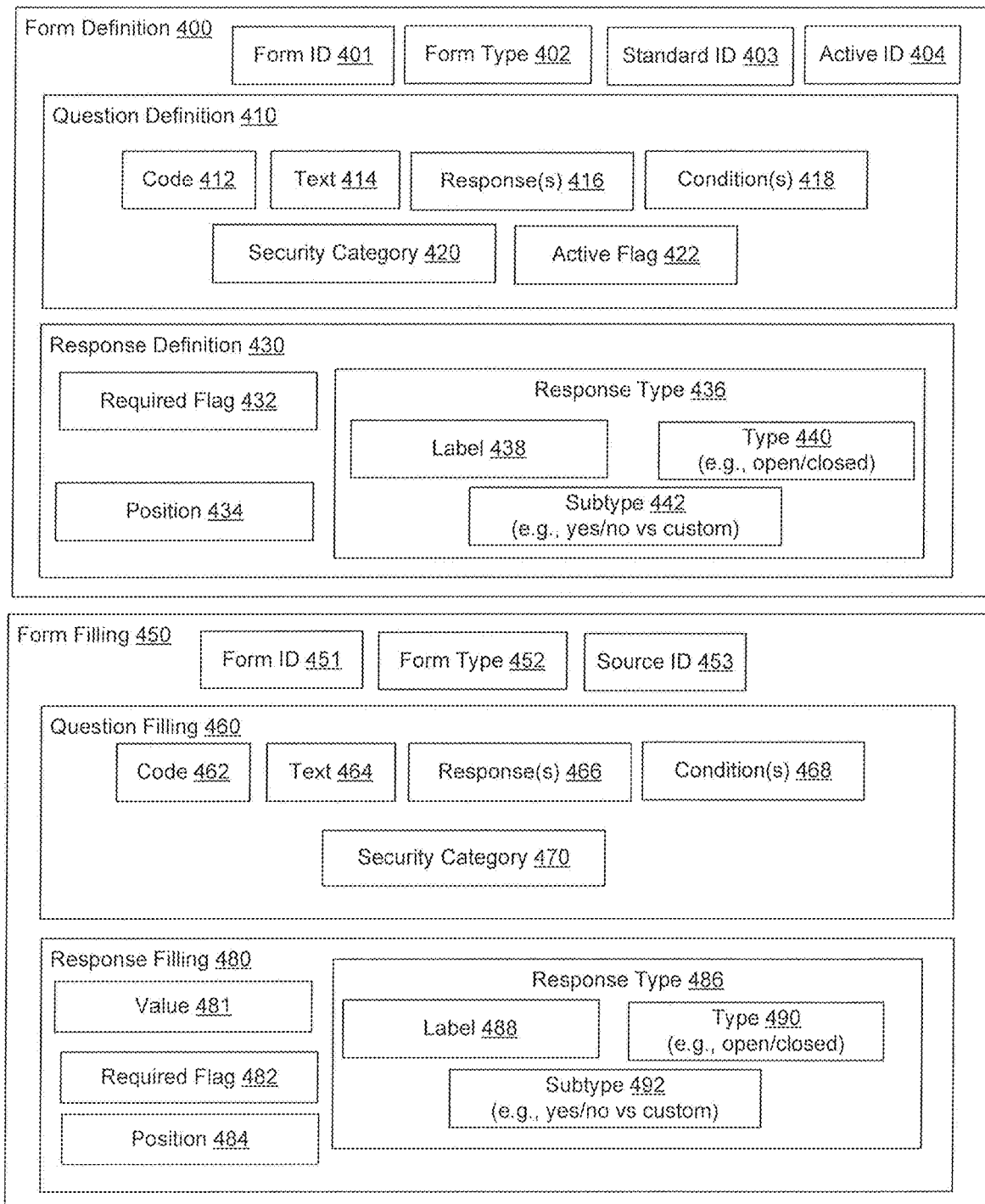
FIG. 4 is a block diagram that includes examples of a representation of a form having a definition type and a representation of a from having a filling type.

Referring to FIG. 4, examples of a representation of a form having a definition type and a representation of a from having a filling type are shown. For example, FIG. 4 includes a form definition 400 and a form filling 450. One or more aspects of form definition 400 and form filling 450 may include or correspond to aspects of definition type and form type described with reference to at least form tracking data 286 of FIG. 2. In some implementations, a form filling (e.g., 450) may be created from a form definition (e.g., 400). In other implementations, a form filling (e.g., 450) may be created from a form definition (e.g., 400). For example, referring to server 110 of FIG. 2, server 110 may be configured to only create a form filling (e.g., 450) from a form definition (e.g., 400).

Referring to form definition 400, form definition 400 represents a questionnaire and includes a form ID 401, a form type 402, a standard ID 403, an active ID 404, a question definition 410, and a response definition 430. In some implementations, response definition 430 may correspond to and/or be included in question definition 410. Although form definition 400 is shown as having one question definition 410, in other implementations, form definition 400 may include multiple question definitions (e.g., 410). Additionally, or alternatively, although one response definition 430 is shown as corresponding to question definition 410, in other implementations, question definition 410 may include or correspond to multiple response definitions (e.g., 430).

Form ID 401 includes an identifier to uniquely identify form definition 400. Form type 402 is configured to indicate a type and/or a subtype of form definition 400. For example, form type 402 may indicate that form definition 400 has a definition type and has a subtype that is a system subtype or a custom subtype. Standard ID 403 may indicate a standard (e.g., NIST, SIG, ISO 9001, etc.) to which the form definition corresponds. Active ID 404 may indicate whether form definition 400 is active or inactive.

Question definition 410 represents a single question and includes a question code 412, question text 414, one or more question responses 416, one or more question conditions 418, a security category 420, and an active/inactive flag 422. Question code 412 includes a unique identifier for a question within question definition 410 (within a single questionnaire). Question text 414 include text corresponding to a question. Although described as text, in some implementations, question text 414 may additionally, or alternatively, include audio, an image, a graphic, etc. The one or more question responses 416 indicate an input to be received for question definition 410. The one or more question conditions 418 indicate a condition related to question definition 410. For example, the condition may indicated whether a question is related to or based on an earlier question. Security category 420 may indicate a category, such as a cybersecurity risk assessment category for question definition 410. The active/inactive flag 422 is configured to indicate whether the question definition 410 should be used or not. To illustrate, if there are multiple questions (e.g., question definitions) with the same value in question code 412 in a form definition (e.g., a single questionnaire) only one of those question definitions can be active.

Response definition 430 represents a single response and includes a required flag 432, a position 434, and a response type 436. Required flag 432 indicates whether or not the corresponding response definition 430 is required. Position 434 indicates a position and/or an order of response definition 430 with respect to one or more other response definitions (e.g., 430) that correspond to question definition 410. For example, position 434 may indicate whether a response definition 430 is positioned to the left, right, above, below, etc., of one or more other response definitions. Response type 436 represents a response type and includes a label 438, a type 440, and, optionally, a subtype 442. Label 438 may provide may be unique label for the response type 436. Type 440 may indicate whether the response definition 430 is an open-ended response or a close-ended response. Subtype 442 may indicate additional aspects of type 440. For example, when type 440 indicates a close-ended response, subtype 442 may indicate whether acceptable closed ended responses are Y/N, Y/N/NA, never/sometimes/frequently, a range of values, etc.

Referring to form tilling 450, form filling 450 represents a questionnaire and includes a form ID 451, a form type 452, a source ID 453, a question filling 460, and a response filling 480. Response filling 480 may correspond to and/or be included in question filling 460. Although form filling 450 is shown has having one question filling 460, in other implementations, form filling 450 may include multiple question fillings (e.g., 460). Additionally, or alternatively, although one response filling 480 is shown as corresponding to question filling 4610, in other implementations, question filling 460 may include or correspond to multiple response fillings (e.g., 480).

Form ID 451 includes an identifier to uniquely identify form filling 450. Form type 402 is configured to indicate a type of form filling 450. For example, form type 452 may indicate that form filling 450 has a filling type. Source ID 453 may indicate a form definition (e.g., form definition 400), such as a form ID 401, to which to which the form filling 450 corresponds.

Question filling 460 represents a single question and includes a question code 462, question text 464, one or more question responses 466, one or more question conditions 468, and a security category 470. When form filing 450 is created from form definition 400, question code 462, question text 464, one or more question responses 466, one or more question conditions 468, and security category 470 may include or correspond to question code 412, question text 414, one or more question responses 416, one or more question conditions 418, and security category 420, respectively.

Response filling 480 represents a single response and includes a value 481, a required flag 482, a position 484, and a response type 486. Value 481 may include an answer (e.g., a response). Response type 486 represents a response type and includes a label 488, a type 490, and, optionally, a subtype 492. When form filing 450 is created from form definition 400, required flag 482, position 484, a response type 486, label 488, type 490, and subtype 492 may include or correspond to required flag 432, a position 434, a response type 436, label 438, type 440, and subtype 442, respectively.

Although each of form definition 400 and form filling 450 has been described as including one or more parts and/or fields, such descriptions are for illustration purposes and are not intended to be limiting. For example, form definition 400 may include more parts/fields or fewer parts/fields than described. To illustrate, in some implementations, form definition may not include conditions 418 and position 434. Additionally, or alternatively, one or more of described parts/fields may include multiple subfields.

Thus, FIG. 4 illustrates an example of form definition 400 (e.g., a form having a definition type) and form filling 450 (e.g., a form having a filling type. Form definition 400 and/or form filling 450 may be used by server 110 (e.g., application 271) to generate and track master forms and request forms. Because each there is only one active master form for each standard, and each form filling is generated from a master form (e.g., an active master form), data coherence and consistency may be maintained by server 110 and data conflict can be easily identified and addressed.

Referring to FIGS. 5A-5F, representations of different stages of response propagation—e.g., how a value of a response propagates from one form to one or more other forms—are shown. The different stages of response propagation may be performed by server 110, such as by processor 250 and/or one or modules (e.g., 252, 253, 254, 256, 258, 260, 262) described with reference to processor 250. The different stages of FIGS. 5A-5F are associated with a first entity (e.g., 230) that has created an account to access a server, such as server 110 (e.g., application 272). For example, a user of the entity may have established one or more credentials (e.g., 273) to enable the user to access server 110 on behalf of the first entity.

Upon creation of the account, entity data 275 may be partitioned to establish corresponding entity data (e.g., 280) for the first entity and server 110 may store master forms, such as master questionnaires for four standards, each of which has two questions. The four standards may include a first standard AAA, a second standard BBB, a third standard CCC, and a fourth standard DDD. As used herein with reference to FIGS. 5A-5F, use of "-M" after a form identifier indicates that the corresponding form is a master form. In some implementations, master forms AAA, BBB, CCC, DDD include or correspond to the set of forms 300 having corresponding mappings 320 or 340. Each representation shown in FIGS. 5A-5F indicates, for each form in the system associated with the first entity, each question of each form and a corresponding value (e.g., a response value). As described herein with reference to FIGS. 5A-5F, mapping 320 and/or mapping 340 is used for the first standard AAA, the second standard BBB, the third standard CCC, and the fourth standard DDD.

Referring to FIG. 5A, a first stage of response propagation is shown and designated 500. The first stage 500 shows that status of master forms AAA, BBB, CCC, DDD after an account for the entity (e.g., 230) has been established. As shown, master form AAA (identified as "AAA-M") includes two questions: A.01 and A.02, master form BBB (identified as "BBB-M") includes two questions: B.01 and B.02, master form CCC (identified as "CCC-M") includes two questions: C.01 and C.02, and master form DDD (identified as "DDD-M") includes two questions: D.01 and D.02. Additionally, as shown, the first entity has not answered any of the questions and, accordingly, corresponding response values for each question are blank.

Referring to FIG. 5B, a second stage of response propagation is shown and designated 510. The second stage 510 shows the result of one or more events/operations that occurred after the first stage 500. For example, after the first stage 500, a second entity (e.g., 240) has requested master form BBB from the first entity. In response to the request, a request form BBB (identified "BBB-R1" is created) from master form BBB (BBB-M), where use of "-R#" after a form identifier indicates that the corresponding form is a request form. For example, the request form may be generated by request generator module 258 of FIG. 2. It is noted that response form BBB (BBB-R1) is created from a form definition (e.g., 400) of master form BBB (BBB-M). Accordingly, the second stage 510 includes request form BBB (identified as BBB-R1), which includes two questions: B.01 and B.02. In addition to creating response form BBB (BBB-R1), response values from the questions of master form BBB are copied into the response values of request form BBB. It is noted that because the response values for the questions of master form BBB are empty, so too are the response value for the questions of request form BBB.

Referring to FIG. 5C, a third stage of response propagation is shown and designated 520. The third stage 520 shows the result of one or more events/operations that occurred after the second stage 510. For example, after the second stage 510, the first entity receives notification of request form BBB. The first entity uploads a file ("UPL1") that includes question U1.D.01 having a response value U1.D.01. In some implementations, in response to uploading the file (UPL1), the file (UPL1) is parsed to identify one or more questions and/or one or more responses included in the file. For example, the file (UPL1) may be parsed by the parser module 252 of FIG. 2.

After upload of the file (UPL1), a match operation detected that question D.01 of the file (UPL1) matches question D.01 of master form DDD (DDD-M1) (e.g., matches fourth standard DDD) and triggers static mapping operations that infer that question B.01 of master form BBB and questions C.01 and C.01 of master form CCC are related to question D.01 of master form DDD. For example, the match operation may be performed by matcher module 253 and the static mapping operations may be performed by the mapper module 254. Additionally, a conflict check operation is performed to determine whether one or more response conflicts exist relating to filling in response values for question D.01 of master form DDD, question B.01 of master form BBB, and questions C.01 and C.01 of master form CCC. For example, the conflict check operation may be performed by conflict checker 256. Because response values for each of question D.01 of master form DDD, question B.01 of master form BBB, and questions C.01 and C.01 of master form CCC are empty, no conflict is identified and response values for each of question D.01 of master form DDD, question B.01 of master form BBB, and questions C.01 and C.01 of master form CCC are filled in with the response value U1.D.01 from the file UPL1. Additionally, the response value filled in for question B.01 of master form BBB (BBB-M) also propagates to the response value for question B.01 of request form BBB (BBB-R1).

The third stage 520 thus shows the impact of the first entity uploading the file UPL1. As shown in the third stage 520, three standards (BBB, CCC, DDD) have been updated, standard CCC has been completed, four forms (one of which includes a request form) have been updated, and multiple responses have been filled in/populated. It is noted that response values for questions A.01 and A.02 of master form AAA have not been filled in/populated because the mapping indicates that each of questions A.01 and A.02 is more than one hop away from question D.01 of master form DDD to which the match with question D.01 of the file (UPL1) was detected. In some implementations, in response to identification of additional response values that may be filled in/propagated by extending the response value propagation beyond one hop, a prompt may be provided to the user (e.g., the first entity) to request whether or not to implement additional propagation. In other implementations, response value propagation may not be limited to one hop and response propagation may take place over multiple hops.

Referring to FIG. 5D, a fourth stage of response propagation is shown and designated 530. The fourth stage 530 shows the result of one or more events/operations that occurred after the third stage 520. For example, after the third stage 520, the first entity provides and enters in a response value (M1.B.B02) for question B.02 of response form BBB (BBB-R1). Because the response value for question B.02 of master form BBB (BBB-M) is empty, it is updated to also have response value (M1.B.B02), as shown in the fourth stage 530. Accordingly, standard BBB is now complete.

Referring to FIG. 5E, a fifth stage of response propagation is shown and designated 540. The fifth stage 540 shows the result of one or more events/operations that occurred after the fourth stage 530. For example, after the fourth stage 530, the second entity (e.g., 240) has requested master form CCC from the first entity. In response to the request, a request form CCC (identified "CCC-R2" is created) from master form CCC (CCC-M). For example, the request form may be generated by request generator module 258 of FIG. 2. It is noted that response form CCC (CCC-R2) is created from a form definition (e.g., 400) of master form CCC (CCC-M). Accordingly, the fifth stage 540 includes request form CCC (identified as CCC-R2), which includes two questions C.01 and C.02. In addition to creating response form CCC (CCC-R2), response values from the questions of master form CCC are copied into the response values of request form CCC and, accordingly, each of questions C.01 and C.02 of response form CCC (CCC-R2) have response values U1.D.01. For example, the response values of response form CCC may be filled in/populated by populater module 260 of FIG. 2. It is noted that first entity may receive notification of request form CCC and when first entity accesses the server, first entity will find that request form CCC (CCC-R2) is already filled in and completed.

Referring to FIG. 5F, a sixth stage of response propagation is shown and designated 550. The sixth stage 550 shows the result of one or more events/operations that occurred after the fifth stage 540. For example, after the fifth stage 540, second entity (e.g., 240) has requested master form AAA from the first entity. In response to the request, a request form AAA (identified "AAA-R3" is created) from master form AAA (AAA-M). For example, the request form may be generated by request generator module 258 of FIG. 2. It is noted that response form AAA (AAA-R3) is created from a form definition (e.g., 400) of master form AAA (AAA-M). Accordingly, the sixth stage 550 includes request form AAA (identified as AAA-R3), which includes two questions A.01 and A.02. It is noted that because the response values for the questions of master form AAA are empty, so too are the response value for the questions of request form AAA.

After the sixth stage 550, the first entity may receive notification of request form AAA. The first entity uploads a file ("UPL2") that includes question B.01 having a response value U2.B.01. A match operation is performed and detects that question B.01 of the file (UPL2) matches question B.01 of master form BBB. Because question B.01 of master form BBB already includes a response value of Ul.D.01, no further action is taken. In some implementations, the first entity may be informed that upload of file UPL2 had no impact. Additionally, or alternatively, the first entity may be informed of which forms and/or standards, and/or which questions, have been considered and skipped. In another implementation, after detection of the match between question B.01 of the file (UPL2) matches question B.01 of master form BBB and in response to a determination that question B.01 of master form BBB already includes a response value of U1.D.01, the first entity may be prompted whether or not they want to overwrite existing response value U1.D.01 for question B.01 of master form BBB with response value U2.B.02. In such implementations, first entity may be informed of potential conflicts that may result from such propagation. In response to an input to overwrite exiting response value U1.D.01 for question B.01 of master form BBB with response value U2.B.02, question B.01 of master form BBB has its response value updated to U2.B.02. In some implementations, the updated value of question B.01 of master form may further be mapped and propagated to response values for question B.01 of request form BBB, question A.01 of master form AAA, and question D.01 of master form DDD. In such implementations, first entity may be informed of potential additional mapping and/or potential conflicts that may result from such propagation.

Thus, FIGS. 5A-5F describe an illustrative example of response propagation. By utilizing a mapping of questions of master forms, response values may be propagated between master forms and request forms. The propagation of response values increases a speed with which a form can be completed. Additionally, the matching, mapping, and conflict checking operations provide a safeguard against inconsistent data amongst the form. Accordingly, data integrity and consistency is maintained.

Figure 6:
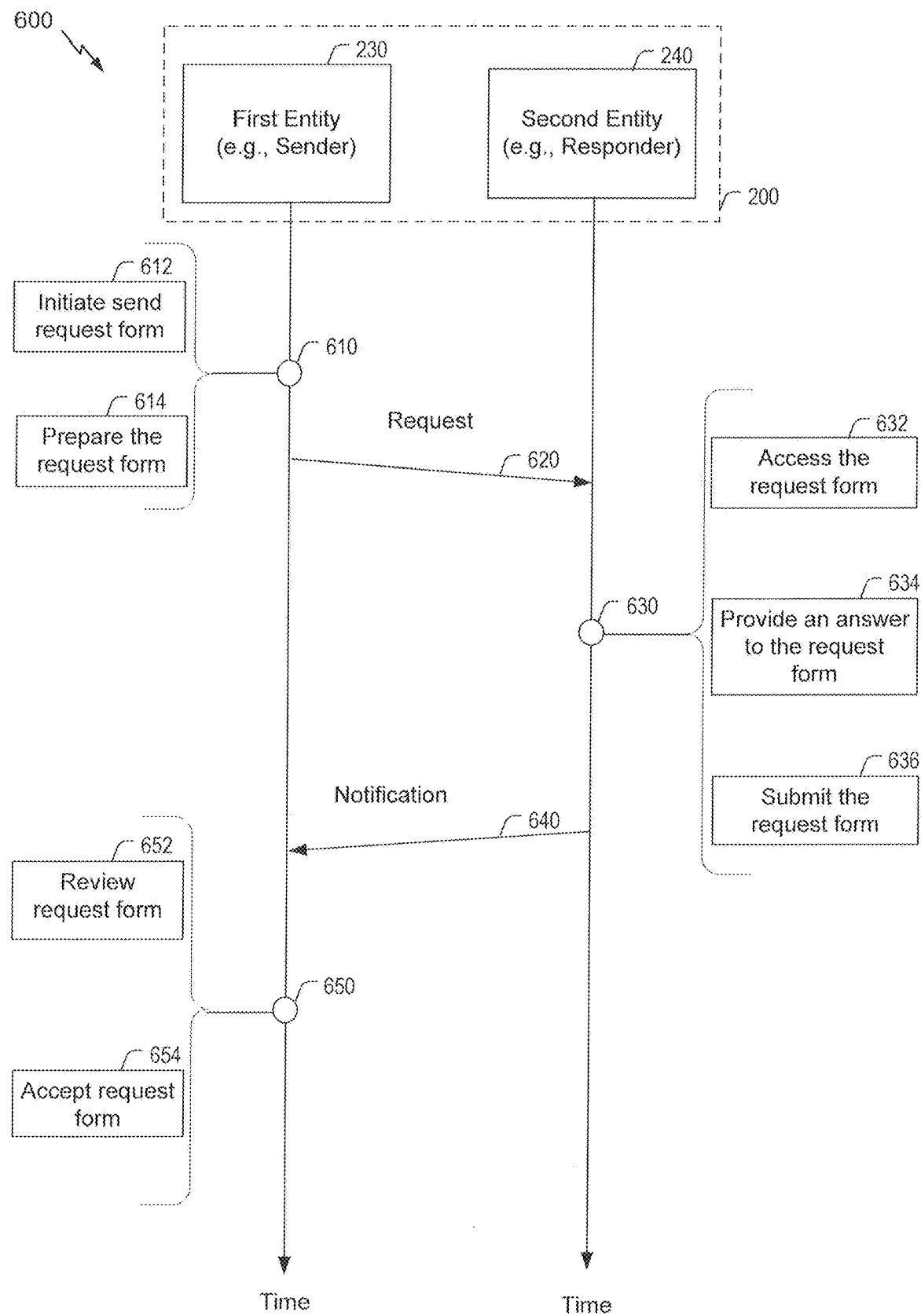
FIG. 6 is a ladder diagram to illustrate an example of states of a request form.

Referring to FIG. 6, a ladder diagram illustrating operation of the system 200 is depicted and generally designated 600. For example, the ladder diagram 600 depicts an example to illustrate states of a request form. The ladder diagram 600 includes system 200 including first entity 230 and second entity 240. It should be noted that operations described with reference to first entity 230 and second entity 240 may be perform at or in conjunction with server 110. For example, each of the first entity 230 (or a user/agent thereof) and the second entity 240 (or a user/agent thereof) may access server 110 and perform and/or initiate operations described herein. To illustrate, first entity 230 may include or corresponds to a user device that includes one or more processors and a memory coupled to the one or more processors and storing instructions executable by the one or more processors to perform operations. The user device may establish a communication link, such as a communication session, with server 110 and may communicate (e.g., send and/or receive) data with server 110. Data received at the user device from server 110 may be presented via a display coupled to or included in the user device. Additionally, or alternatively, the user device may be coupled to or include on or more I/O devices to generate and/or initiate data sent from the user device to server 110. Accordingly, in some implementations, operations described with reference to first entity 230 may include or correspond to inputs received via the user device, data sent from the user device, data received at the user device, data presented/displayed via the user device, or a combination thereof. In some implementations, server 110 (e.g., a module) may initiate a prompt that is sent to first entity 230 via the first user device. First entity 230 may provide a response to the prompt via the first user device which sends response data to server 110. To further illustrate exchanges between the first user device and server 110, a graphical user interface (GUI) may be generated by server 110 and presented via a display device coupled to or included in the first user device to enable first entity 230 to communicate and/or interact with server 110. Examples of one or more GUIs are described further herein at least with reference to FIGS. 10A-10I, 11A-11E, 12A-12B, 13, and 14A-14D It is further noted that second entity 240 may include or correspond to one or more user device as described with reference to the first entity 230.

During operation of the system 200, at a first time 610 (e.g., a first time period), first entity 230 initiates sending a request form for second entity 240, at 612, and prepares the request form at 614. For example, a first user device associated with first entity 230 may receive a first input associated with the request and, responsive to the first input, may send request data to server 110. First user device may receive and present request form data from server 110 and may receive one or more additional inputs to customize the request form. The request form may be associate with a request form 284 and/or may be generated by request generator module 258. During the time period associated with first time 610, the request form may have a "CREATED" status. While in the request form is in the created status, no response values have been populated in the request form, the first entity 230 can edit and/or modify the request form, such as add/remove attachments or response type, comment, designate one or more questions as required, set a due date, set a reminder, or a combination thereof, as illustrative, non-limiting examples. Aspects of creation of a request form are described further herein at least with reference to FIGS. 10A-10I.

At a second time 620 (e.g., a second time period), first entity 230 sends a request to second entity to inform second entity 240 that there is a pending request form for second entity 240. For example, the first user device may receive an send request input that is communicated to server 110. Responsive to receiving the send request input from the first user device, server 110 may send a notification to a second user device associated with second entity 240. In some implementations, first entity initiating and/or sending the request form to the second entity 240 may change the request from to a "RESPONDER IN PROGRESS" status. In other implementations, the request form may remain in the create status while the second entity 240 is notified of the request.

At a third time 630 (e.g., a third time period), second entity 240 accesses the request form, at 632, and provides an answer to at least one question of the request form, at 634. For example, to access the request form, the second user device may establish a communication link, such as a communication session, with server 110. Server 110 may provide request form data to the second user device and the second user device may receive one or more inputs associated with responding to the request. The one or more inputs may be provided to server and changes to the requests form may be reflected via a display device coupled to or included in the second user device. Aspects of accessing and responding to the request form by the second entity 240 (e.g., the responder) are described further herein at least with reference to FIGS. 11A-11E. In some implementations, the request form may transition from the created status to the responder in progress status in response to second entity 240 accessing the form. In other implementations, the request form may not transition from the created status to the responder in progress status until second entity provides at least one answer to the request form. In situations where second entity accesses the request form while it is still in the created status, second entity 240 may be able to provide comments, add/remove attachments, download the request form, or a combination thereof while the request form maintains the created status.

When the request form is in the responder in progress status, second entity 240 can provide answers, assign questions to one or users associated with second entity 240, add/remove attachments, comment, and/or change a status of the request form to a "SENDER IN PROGRESS" status. Additionally, when the request form is in the responder in progress status, first entity 230 can provide comments, add/remove attachments, download the request form, or a combination thereof.

At/during the third time 630 (e.g., during the third time period), second entity 240 can submit the request form, at 636. For example, the second user device may receive a submit input that is communicated to server 110. Responsive to receiving the submit input from the second user device, server 110 may send a notification to the first user device. Submitting the request form may change the request form to the sender in progress status. At a fourth time 640 (e.g., during a fourth time period), a notification is provided to first entity 230 notifying first entity 230 that the request form has been submitted for review.

At a fifth time 650 (e.g., a fifth time period), first entity 230 may access and review the request form, at 652, and accept request form, at 654. Aspects of accessing and reviewing the request form by first entity 230 (e.g., the sender) are described further herein at least with reference to FIGS. 12A-12B. When first entity 230 access and reviews the request form while the request form is in the sender in progress status, first entity 230 can work on the request form, add/re remove attachments, comment, download the request form, and/or change a status of the request form back to responder in process or to an "ACCEPTED" status. For example, operation described as being performed by first entity 230 may include or correspond to one or more inputs received at the first user device and/or communication to server 110. Additionally, while in the sender in progress status, second entity 240 can provide comments, add/remove attachments, download the request form, or a combination thereof. When the request form is in the accepted status, each of first entity 230 and second entity 240 can add/remove attachments and/or comment.

Thus, FIG. 6 demonstrates how a status of a request form changes and corresponding permissions and access/edit rights for each of first entity 230 and second entity 240 for each status. The different permissions and access/edit rights ensure data integrity and consistency is maintained during processing of the form from creation to completion. Additionally, the ability of each of first entity 230 and second entity 240 to provide comments, add/remove attachments, and/or download the request form at multiple stages enables first entity 230 and second entity 240 to collaborate via the request form in a documented manner. Such collaboration may occur in real time and decrease an amount of time needed to complete the request form.

Figure 7:
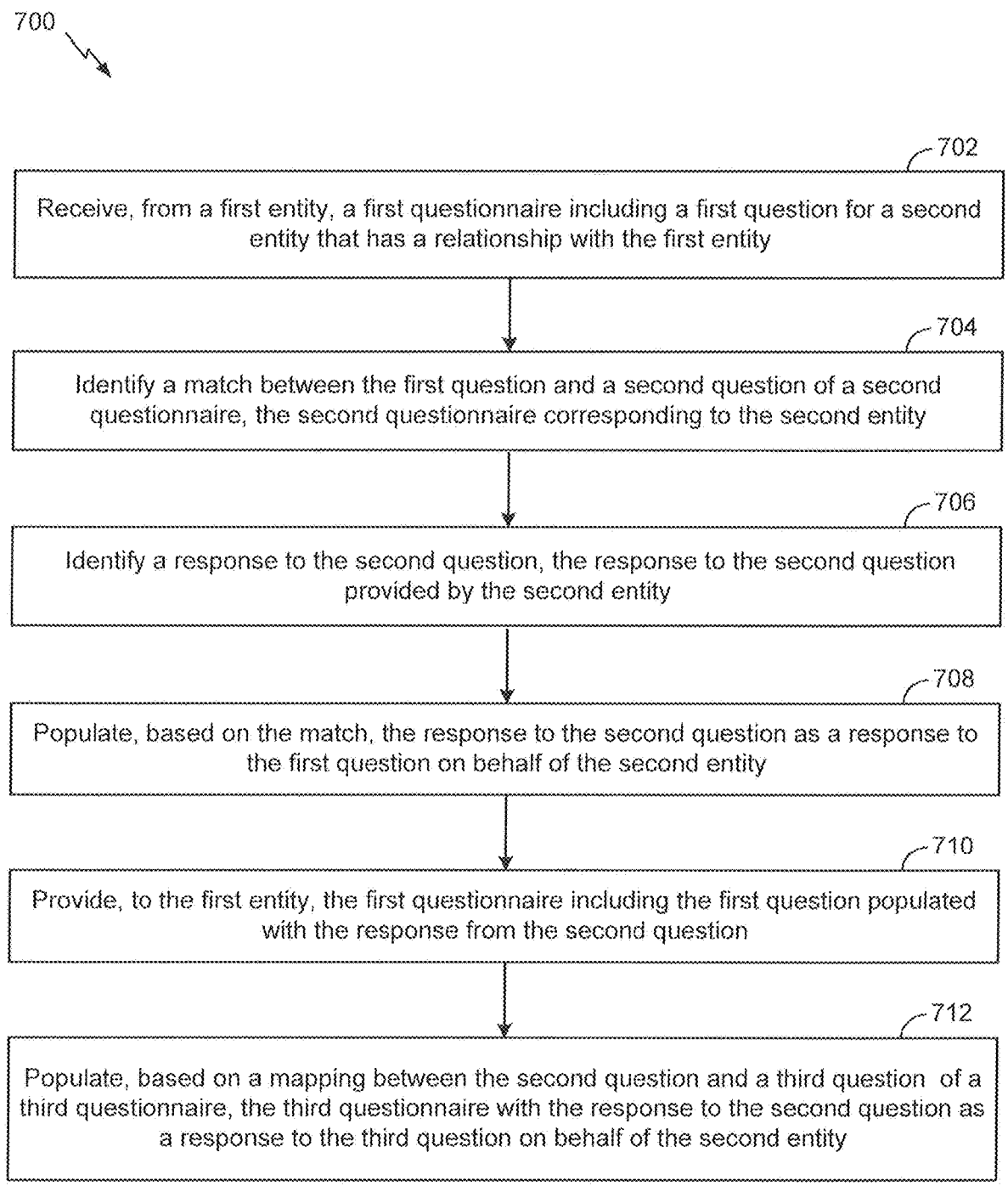
FIG. 7 is a flow diagram of an example of a method for populating data sets indicative of risk level of a first entity having a relationship with a second entity.
Figure 8:
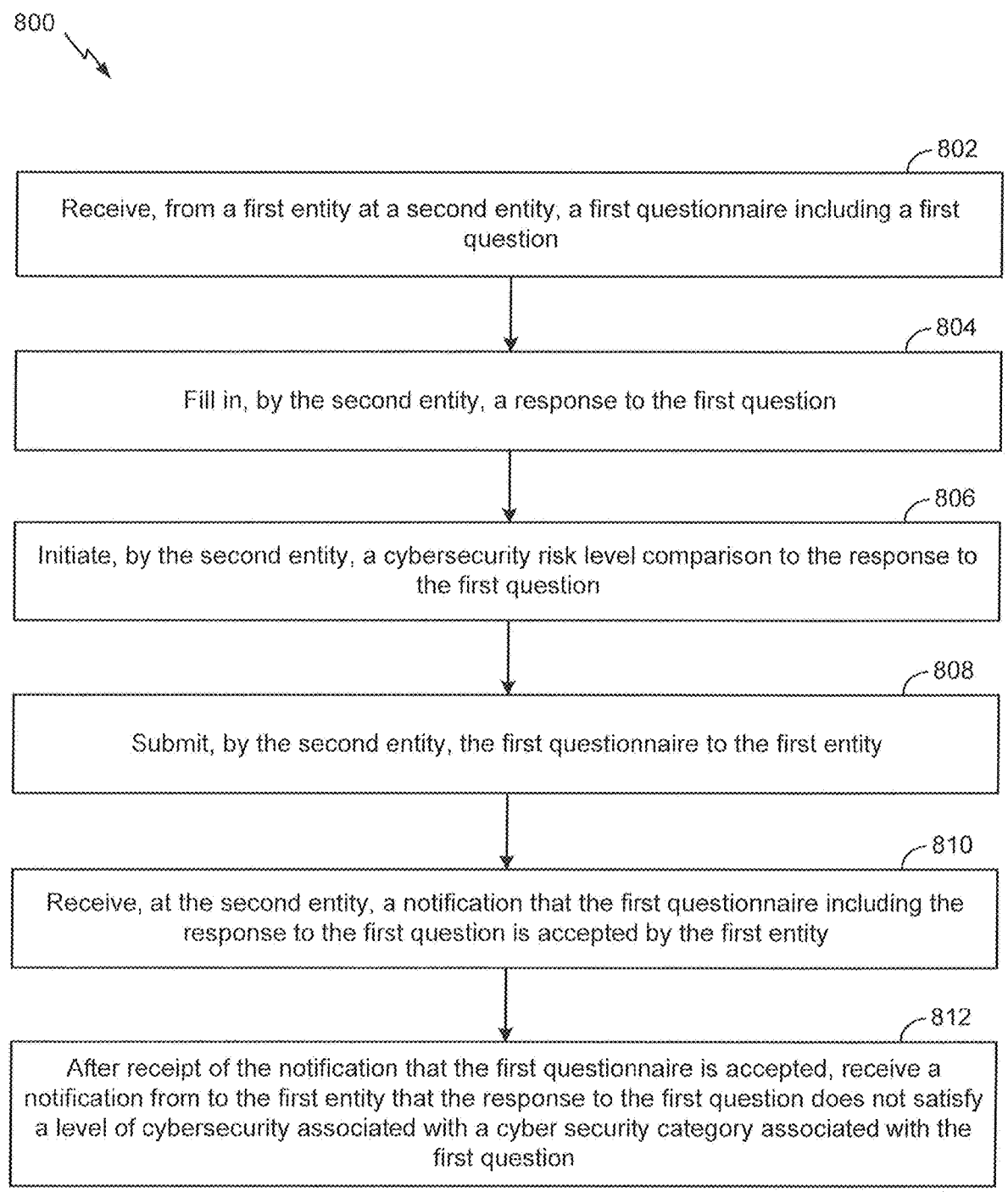
FIG. 8 is a flow diagram of an example of a method for identifying a cybersecurity issue associated with an entity based on one or more responses to questionnaire.
Figure 9:
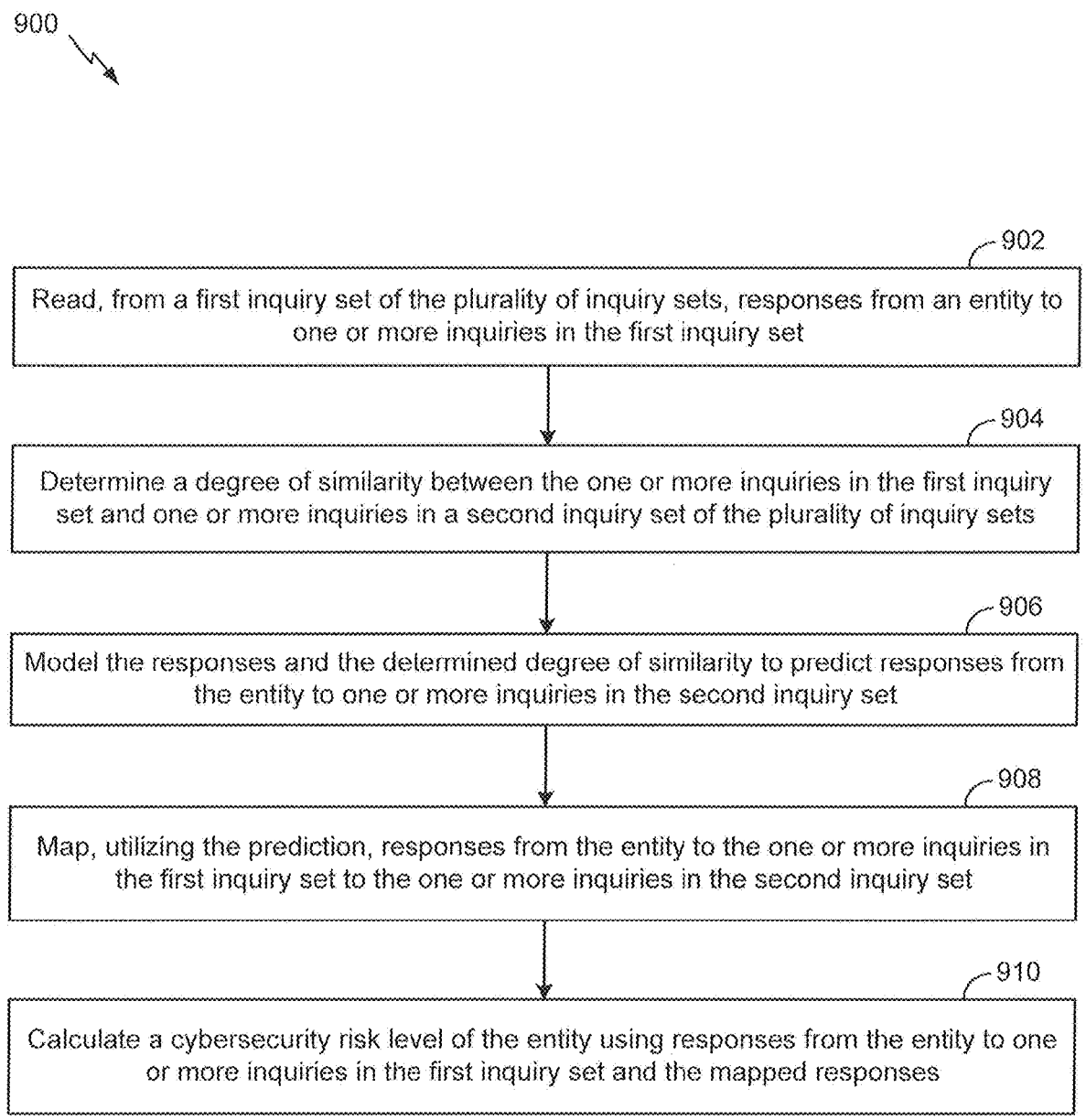
FIG. 9 is a flow diagram of another example of a method determining a cybersecurity risk level of an entity by mapping responses to a plurality of inquiry sets directed to the entity.

FIGS. 7-9 are flow diagrams of methods of mapping responses to a plurality of inquiry sets directed to the entity. For example, the entity may include or correspond to entity 140, first entity 230, or second entity 240. In some implementations, the method of FIGS. 7-9 may also determine a cybersecurity risk level based the mapping of the responses. Each of the methods of FIGS. 7-9 may be stored in a computer-readable storage medium as instructions that, when executed by one or more processors, cause the one or more processors to perform the operations of the method (e.g., 600, 700, 800). In an embodiment, the methods of FIGS. 7-9 may be performed by the server 110 (e.g., one or more processors 250) of FIGS. 1 and 2, by the system 200 of FIG. 6, or a combination thereof.

Referring FIG. 7 is a flow diagram of a method for populating data sets indicative of risk level of a first entity having a relationship with a second entity according to an embodiment is shown as a method 700. At 702, method 700 includes executing a first routine to receive, from a first entity, a first questionnaire including a first question for a second entity that has a relationship with the first entity. For example, firs entity and second entity may include or correspond to first entity 230 and second entity, respectively. The first questionnaire may include or correspond to a request form (e.g., 284).

At 704, method 700 includes executing a second routine to identify a match between the first question and a second question of a second questionnaire, the second questionnaire corresponding to the second entity. The second questionnaire may include a master form or a request form of the second entity. To illustrate, the second entity may be associated with one or more request forms that include at least the first questionnaire. In some implementations, in response to receiving the first questionnaire, the second entity may upload the second questionnaire. For example, the match may be identified by matcher module 253.

At 706, method 700 includes executing a third routine to identify a response to the second question, the response to the second question provided by the second entity, and, at 708, method 700 includes executing a fourth routine to populate, based on the match, the response to the second question as a response to the first question on behalf of the second entity. For example, mapper module 254 may populate the response of the second question to be filled in as a response to the first question. In some implementations, after populating the response to the first question with the response to the second question, method 700 may include receiving a submission request from the second entity to submit the first questionnaire to the first entity, and prior to providing the first questionnaire to the first entity, determining a level of cybersecurity of the second entity for the cybersecurity category, comparing the level of cybersecurity with the populated response of the first question, and notifying the second entity of a discrepancy between the level of cybersecurity with the populated response of the first question; and prompting the second entity to modify the populated response of the first question prior to providing the first questionnaire to the first entity.

At 710, method 700 includes executing a fifth routine to provide, to the first entity, the first questionnaire including the first question populated with the response from the second question. In some implementations, method 700 may include, after providing the first questionnaire to the first entity, determining a level of cybersecurity of the second entity for a cybersecurity category (of the first question), comparing the level of cybersecurity with the populated response of the first question, and notifying the first entity of a discrepancy between the level of cybersecurity with the populated response of the first question. Alternatively, in other implementations, method 700 includes after providing the first questionnaire to the first entity, determining a level of cybersecurity of the second entity for a cybersecurity category (of the first question), comparing the level of cybersecurity with the populated response of the first question, determining the populated response of the first question is consistent with the level of cybersecurity, and receiving an indication from the first entity that the first questionnaire is accepted. In some such implementations, after receiving an indication from the first entity that the first questionnaire is accepted, method 700 may also include determining a second level of cybersecurity of the second entity for the cybersecurity category, comparing the second level of cybersecurity with the populated response of the first question, and notifying the first entity of a discrepancy between the second level of cybersecurity with the populated response of the first question of he accepted first questionnaire.

At 712, the method 700 includes executing a sixth routine to populate, based on a mapping between the second question and a third question of a third questionnaire, the third questionnaire with the response to the second question as a response to the third question on behalf of the second entity. To illustrate, the third questionnaire may include a master form or a request form of the second entity. The second question may be mapped to multiple questions of multiple questionnaires. In this manner, multiple questionnaires can benefit from the response to the second question included in the second questionnaire.

In some implementations, method 700 may include identifying a plurality of master forms corresponding to the second entity. For example, the plurality of master forms may include or correspond to set of forms 300. The plurality of master forms include, for each standard that the second entity is aware of, a corresponding single master form. Each master form of the plurality of master forms includes an active master form associated with a form definition (e.g., 400) including one or more question definitions (e.g., 410). Each question definition of the one or more question definitions includes a question code (e.g., 412), question text (e.g., 414), one or more question responses (e.g., 416), an active/inactive flag (e.g., 422), a response definition type (e.g., 436), a cybersecurity category (e.g., 420), or a combination thereof.

In some implementations, the plurality of master forms includes the second questionnaire, a third questionnaire, and a fourth questionnaire. In such implementations, method 700 may also include generating a mapping of matched questions of the plurality of master forms. For example, the mapping may be generated by matcher module 253, mapper module 254, and/or conflict checker module 256. The mapping may include or correspond to mapping 320, 340 and may indicate one or more matched questions between two master forms of the plurality of master forms. In a particular implementation, generating a mapping of matched questions of the plurality of master forms may include detecting a match between the fourth question of the second questionnaire and a fifth question of the third questionnaire, detecting a match between the fourth question of the second questionnaire and a sixth question of the fourth questionnaire, and identifying whether the fourth question of the second questionnaire includes a first response type that is not included as a response type in either of the fifth question of the third questionnaire and the sixth question of the fourth questionnaire.

In some such implementations, method 700 may also include detecting a match between a third question of the first questionnaire and a fourth question of the second questionnaire, and receiving a response to the third question of the first questionnaire. Based on the response to the third question of the first questionnaire, the response of the third question of the first questionnaire may be populated as a response of the fourth question of the second questionnaire, and the populated response of the fourth question of the second questionnaire may be mapped as a response to a fifth question of the third questionnaire and as a response to a sixth question of the fourth questionnaire. Additionally, or alternatively, based on the mapping, method 700 may include identifying one or more matches, such as a first match between the fourth question of the second questionnaire and a fifth question of the third questionnaire, and a second match between the fourth question of the second questionnaire and a sixth question of the fourth questionnaire. In response to a determination that the fourth question of the second questionnaire and the fifth question of the third questionnaire have the same response type, the populated response of the fourth question of the second questionnaire may be populated as a response to the fifth question of the third questionnaire. For example, conflict checker module 256 may determine the questions have the same response type and the populater module 260 may populate the response from one question to another question. Alternatively, in response to a determination by conflict checker module 256 that the fourth question of the second questionnaire and the fifth question of the third questionnaire have different response types, a prompt may be generated for the second entity to provide a response to the sixth question of the fourth questionnaire based on the populated response of the fourth question of the second questionnaire.

In some implementations, the method 700 may further include receiving a modification of the response to the fifth question of the third questionnaire and identifying the modified response of the fifth question of the third questionnaire is different from the populated response of the fourth question of the second questionnaire. For example the conflict checker module 256 may detect that the modified response is different from the populate response of the fourth question. A prompt may be provided to for the second entity to designate one of the modified response of the fifth question of the third questionnaire or the populated response of the fourth question of the second questionnaire for use as the same response for each of the fifth question of the third questionnaire and the fourth question of the second questionnaire.

In some implementations, method 700 includes receiving, by the one or more processors, the fourth questionnaire for the second entity and identifying the fourth questionnaire as a master form. In some such implementations, method 700 further includes identifying a format of the fourth questionnaire and determining whether to parse the fourth questionnaire based on the format of the fourth questionnaire. Based on a determination to parse the fourth questionnaire, a parser is selected from multiple parsers based on the format of the fourth questionnaire and the fourth questionnaire is parsed using the selected parser to generate, for each question of the fourth questionnaire, a corresponding question definition.

In some implementations, method 700 may include receiving, by the one or more processors, a request from the second entity to generate, based on the fourth questionnaire, a fifth questionnaire for the first entity. In some such implementations, method 700 further includes generating the fifth questionnaire based on one or more question definitions of the fourth questionnaire having an active status; and providing the fifth questionnaire to the first entity.

In some implementations, method 700 may include identifying based on the first question, by the one or more processor, a cybersecurity category of the first question of the first questionnaire. The cybersecurity category may include a social networking category, a malware and botnet infections category, an application vulnerabilities category, a breach history category, a network exploits category, a domain name system (DNS) health category, a patching cadence category, or a leaked employee credentials category, as illustrative, non-limiting examples.

In some implementations, method 700 includes generating a visual representation that depicts the relationships between the first entity and the second entity and between the first entity and each of one or more additional entities. To illustrate, the visual representation may include, for the second entity, an indication of a cybersecurity rating, an industry cybersecurity percentile ranking, an indication of a number of questionnaires sent from the first entity to the second entity for response, an indication of a number of questionnaires sent from the second entity to the first entity for response, one or more tag, or a combination thereof, as illustrative, non-limiting examples. The method 700 may also include receiving a filter input associated with the visual representation, and in response to the filter input, modifying the visual representation to depict one or more relationships, based on the filtered input, between the first entity and one or more other entities. Additionally, or alternatively, method 700 may include receiving a selection, via the visual representation, of the second entity and generating a second visual representation that indicates information associated with each questionnaire sent from the first entity to the second entity for response, information associated with each questionnaire sent from the second entity to the first entity for response, or both.

Referring FIG. 8 is a flow diagram of a method for identifying a cybersecurity issue associated with an entity based on one or more responses to questionnaire according to an embodiment is shown as a method 800. At 802, the method 800 includes executing a first routine to receive, from a first entity at a second entity, a first questionnaire including a first question. At 804, the method 800 includes executing a second routine to fill in, by the second entity, a response to the first question and, at 806, the method 800 includes executing a third routine to initiate, by the second entity, a cybersecurity risk level comparison to the response to the first question.

At 808, the method 800 includes executing a fourth routine to submit, by the second entity, the first questionnaire to the first entity. At 810, the method 800 includes executing a fifth routine to receive, at the second entity, a notification that the first questionnaire including the response to the first question is accepted by the first entity. At 812, the method 800 includes executing a sixth routine to, after receipt of the notification that the first questionnaire is accepted, receive a notification from to the first entity that the response to the first question does not satisfy a level of cybersecurity associated with a cyber security category associated with the first question.

Referring FIG. 9 is a flow diagram of a method for determining a cybersecurity risk level of an entity by mapping responses to a plurality of inquiry sets directed to the entity according to an embodiment is shown as a method 900. At 902, method 900 includes executing a first routine to read, from a first inquiry set of the plurality of inquiry sets, responses from an entity to one or more inquiries in the first inquiry set. In an embodiment, the first routine may correspond to the routine of parser module 252 and/or matcher module 253 of FIG. 2. In some implementations, each inquiry set of the plurality of inquiry sets corresponds to a questionnaire (e.g., a different questionnaire).

At 904, method 900 includes executing a second routine to determine a degree of similarity between the one or more inquiries in the first inquiry set and one or more inquiries in a second inquiry set of the plurality of inquiry sets. In an embodiment, the second routine may correspond to the routine of matcher module 253 of FIG. 2. In some implementations, the degree of similarity is determined using a machine learning component or a machine learning algorithm.

At 906, method 900 includes executing a third routine to model the responses and the determined degree of similarity to predict responses from the entity to one or more inquiries in the second inquiry set. In an embodiment, the third routine may correspond to the routine of mapper module 254, conflict checker module 256, and/or populater module 260 of FIG. 2. In some implementations, method 900 may include receiving an input to initiate mapping the responses. Additionally, or alternatively, the responses and the determined degree of similarity are modeled using a machine learning component or a machine learning algorithm. Aspects to of the generated model are described further herein at least with reference to FIG. 11D. In addition, method 900 may also include receiving an upload of a third inquiry set, reading, from the third inquiry set, one or more responses from the entity to one or more inquiries in the third inquiry set, and determining a degree of similarity between the one or more inquiries in the third inquiry set and the one or more inquiries in the second inquiry set.

At 908, method 900 includes executing a fourth routine to map, utilizing the prediction, responses from the entity to the one or more inquiries in the first inquiry set to the one or more inquiries in the second inquiry set. In an embodiment, the fourth routine may correspond to the routine of mapper module 254 and/or populater module 260 of FIG. 2.

At 910, method 900 includes executing a fifth routine to calculate a cybersecurity risk level of the entity using responses from the entity to one or more inquiries in the first inquiry set and the mapped responses. In an embodiment, the fifth routine may correspond to the routine of security module 262 of FIG. 2.

In some implementations, method 900 also includes receiving an upload of the first inquiry set and initiating display of a result of the modeling. In some such implementations, method 900 also includes generating one or more graphical user interfaces (GUIs) via which the first inquiry set is uploaded, the result of the modeling is displayed, the input to initiate mapping the response is received, or a combination thereof.

In some implementations, method 900 also includes comparing the degree of similarity to a similarity threshold and, in response to a determination that the degree of similarity is greater than or equal to the similarity threshold, determining a detected match between the one or more inquiries in the first inquiry set and one or more inquiries in a second inquiry set of the plurality of inquiry sets. In other implementations, method 900 also includes comparing the degree of similarity to a first similarity threshold and, in response to a determination that the degree of similarity is less than or equal to the similarity threshold, comparing the degree of similarity to a second similarity threshold. In some such implementations, in response to a determination that the degree of similarity is greater than or equal to the second similarity threshold, a prompt is generated for user input to indicate whether the one or more inquiries in the first inquiry set and the one or more inquiries in the second inquiry set.

In some implementations, method 900 further includes determining a second degree of similarity between the one or more inquiries in the first inquiry set and one or more inquiries in a third inquiry set of the plurality of inquiry sets and comparing the second degree of similarity to a similarity threshold. In response to a determination that the degree of similarity is less than or equal to the similarity threshold, a mismatch is determined between the one or more inquiries in the first inquiry set and one or more inquiries in the third inquiry set.

Method 900 may include calculating an overall cybersecurity risk score for the entity based, at least in part, on the calculated cybersecurity risk level of the entity. In some such implementations, method 900 also includes determining an industry cybersecurity percentile ranking for the entity based on the calculated cybersecurity risk level of the entity.

In some implementation, method 900 includes comparing the calculated cybersecurity risk level to a cybersecurity threshold; classifying the entity as high risk. An alert is generated when the overall cybersecurity risk score exceeds the cybersecurity threshold. Additionally, or alternatively, method 900 may include classifying the entity as high risk, medium risk, or low risk based on the calculated cybersecurity risk level.

In some implementations, based on the calculated cybersecurity risk level, a user of the entity is notified of the cybersecurity risk level and a recommendation of one or more corrective actions to lower the cybersecurity risk level is provided. Additionally, or alternatively, the method 900 may also include aggregating the calculated cybersecurity risk level with cybersecurity risk levels of other entities in the same industry as the entity to calculate an aggregated calculated risk level for the industry.

In some implementations, the entity is a vendor of a plurality of vendors for a company. In some such implementations, method 900 includes aggregating the calculated cybersecurity risk level with cybersecurity risk levels of other vendors of the plurality of vendors to calculate an aggregated calculated risk level for vendors for the company. A cybersecurity risk level is assigned to the company based on the aggregated calculated risk level for vendors for the company.

In some implementations, methods 700, 800, 900 and/or operations described with reference to at least FIG. 6 can be combined such that one or more operations described with reference to one of the methods of FIGS. 7-9 and one or more operations described above with reference to FIG. 6 may be combined with one or more operations of another of FIGS. 7-9 and the process of FIG. 6. For example, one or more operations of method 700 may be combined with one or more operations of method 800. Additionally, or alternatively, one or more operations described above with reference to FIG. 6 may be combined with one or more operations of one of FIGS. 7-9, or of a combination of FIGS. 7-9.

Figure 12A:
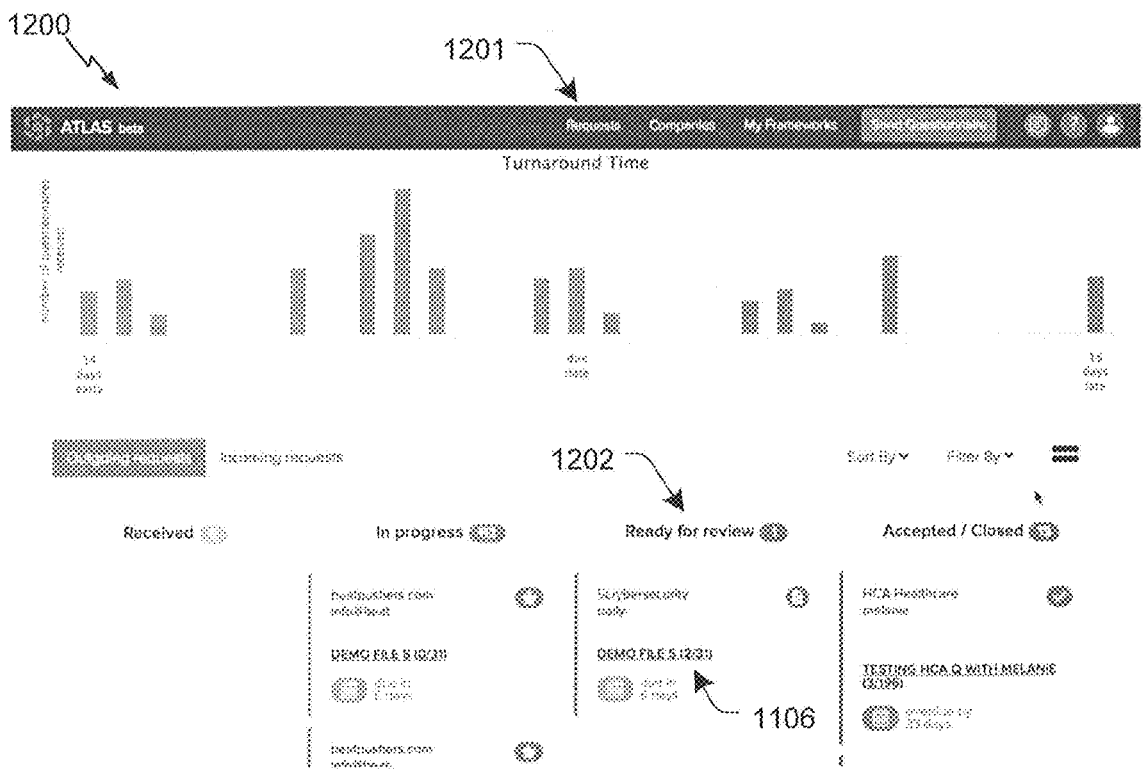
FIGS. 12A-12B illustrate examples of views associated with review of a submitted request form.
Figure 12B:
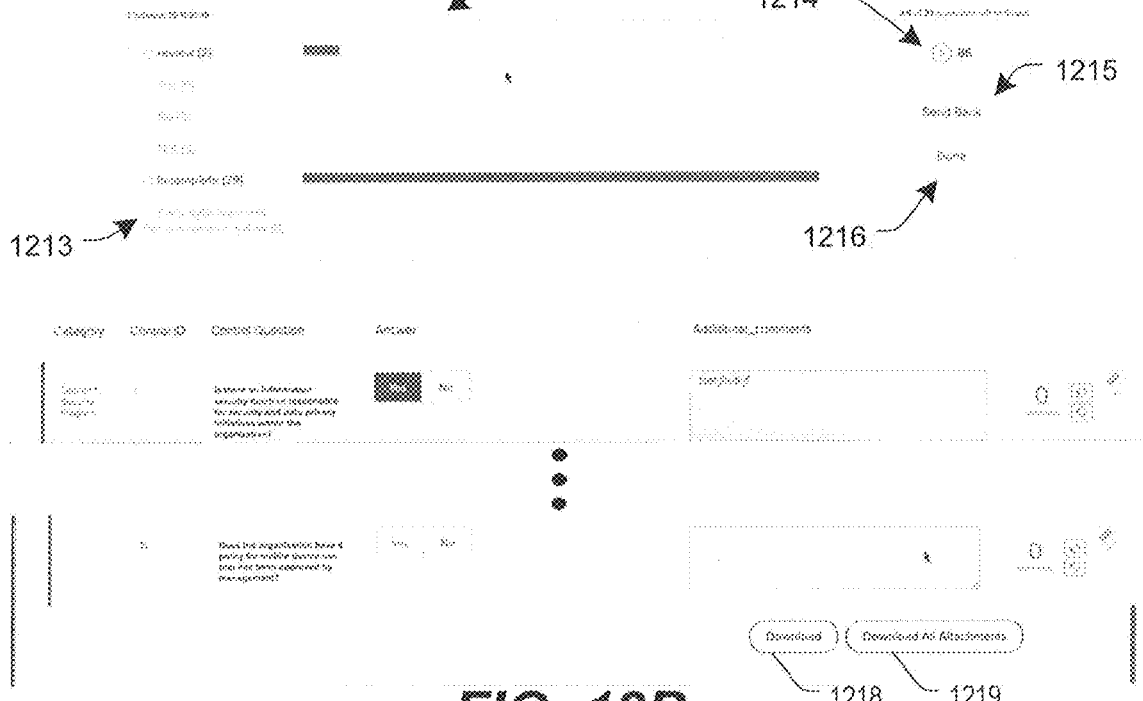
Figure 13:
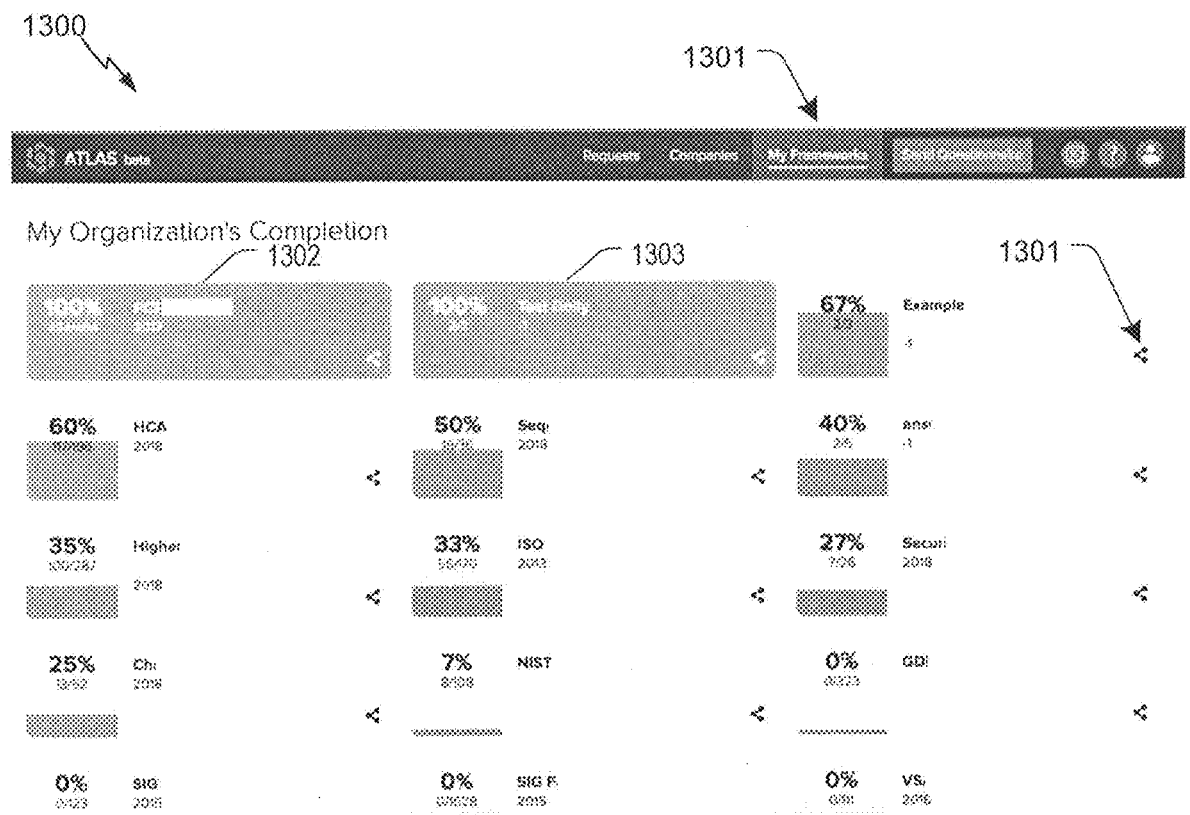
FIG. 13 illustrates a view associated with presentation of entity data.

Referring to FIGS. 10A-10I, 11A-11E, 12A-12B, 13, and 14A-14D, one or more views provided by system 200 are shown. For example, FIGS. 10A-10I include views associated with generation and/or sending of a request form; FIGS. 11A-11E include views associated with responding to a request form; FIGS. 12A-12B include views associated with review of a submitted request form; FIG. 13 shows a view associated with presentation of entity data, such as entity data 270 (e.g., first entity data 280 or second entity data 290); and FIGS. 14A-14D show views of presentation of cybersecurity risk information. One or more of the views may include or correspond to a graphical user interface (GUI) generated by server 110 and presented via a display device, such as a display device of a user device associated with an entity (e.g., 140, 230, 240) or a user associated with the entity. Additionally, or alternatively, interactions (e.g., input selections) with the views may be initiated by the entity (e.g., a user device) and communicated to server 110, and operations/functions to present and/or modify the views may be performed by server 110 and communicated to one or more user devices.

Referring to FIGS. 10A-10I, views presented to a first entity and associated with generation of a request form are shown. For example, referring to FIG. 10A, a first view of a dashboard is shown and designated 1000. The dashboard includes a set of selectable display options/features 1001 including requests, companies, my frameworks, and send questionnaire 1002. Examples of views presented/available responsive to selection of "requests" are described further herein at least with reference to FIGS. 10A-10I, 11A-11E, and 12A-12B. Examples of views presented/available responsive to selection of "companies" are described further herein at least with reference to FIGS. 14A-14D. An example of a view presented/available responsive to selection of "my framework" is described further herein at least with reference to FIG. 13. Examples of views presented/available responsive to selection of "send questionnaire" 1002 are described further herein at least with reference to FIGS. 10B-10I.

First view 1000 also include a visual representation 1003 (e.g., a graph) that indicates a number of requests associated with the first entity based on request due date. Based on selection of one of an outgoing requests option 1004 and an incoming requests option 1005, the visual representation 1003 presents a number of outgoing requests associated with the first entity based on request due date of the outgoing requests or presents a number of incoming requests associated with the first entity based on request due date of the incoming requests. To illustrate, visual representation 1003 of first view 1000 presents turnaround time for outgoing requests option (e.g., 1004). Additionally first view 1000 also includes an indication/listing of received requests 1006 and a listing/indication of in progress requests 1007. As shown, no requests have been received and one hundred and four requests are in progress. One or more of the in progress requests are listed as entries (e.g., selectable entries), such as a representative entry 1008.

Figure 10A:
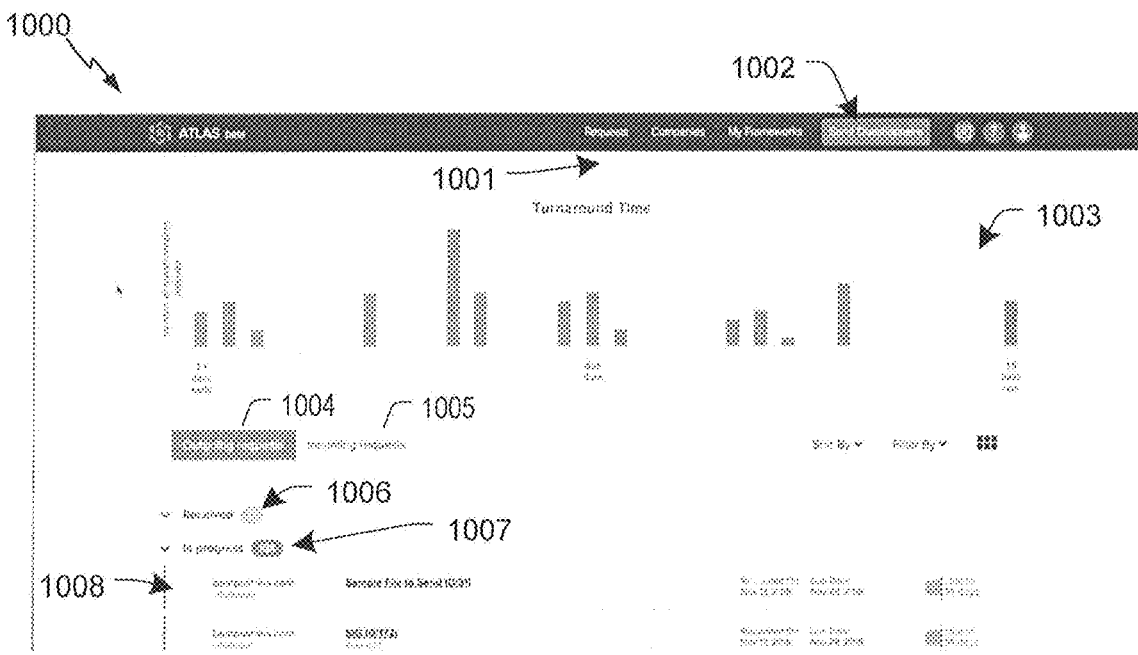
FIGS. 10A-10I illustrate examples of views associated with generation and/or sending of a request form.
Figure 10B:
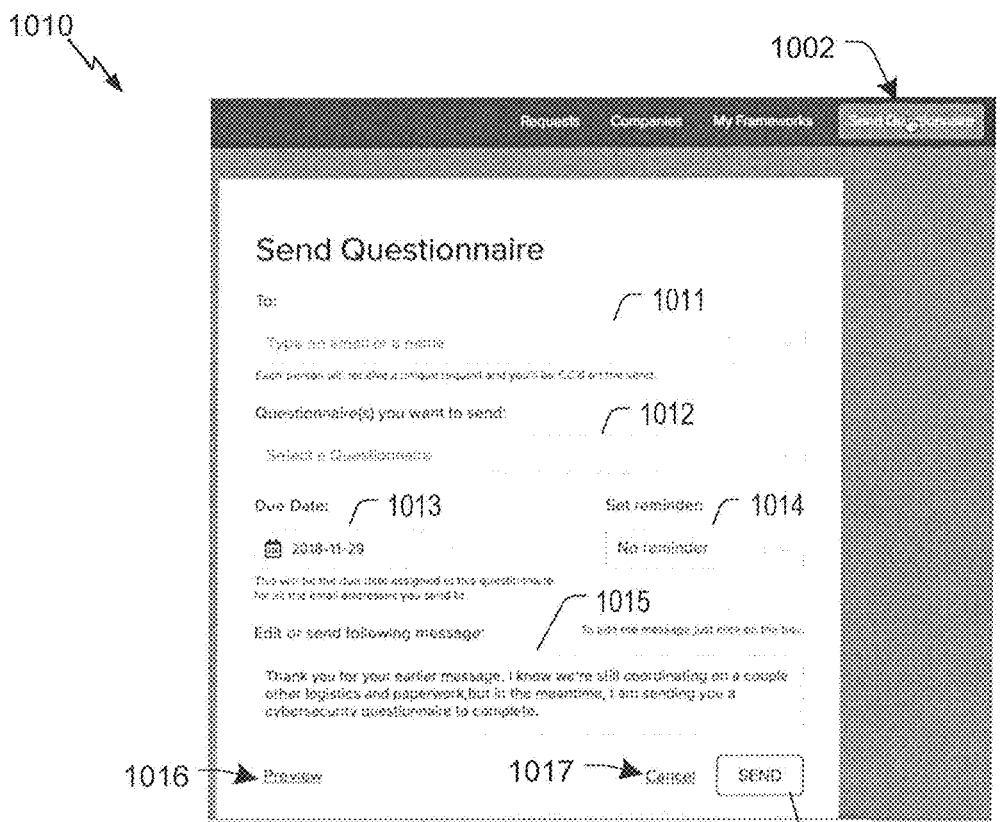

Referring to FIG. 10B, a second view presented responsive to selection of send questionnaire 1002 is shown and designated 1010. Second view 1010 includes input fields such as recipient field 1011, a questionnaire field 1012, a due date field 1013, a reminder field 1015, and a message field 1015. Second view 1010 also includes selectable options, such as a preview 1016, a cancel 1017, and a send 1018. The recipient field 1011 enables the questionnaire to be sent to one or more individuals and/or entities. The one or more individuals and/or entities may or may not have an established credential (e.g., 273).

Figure 10C:
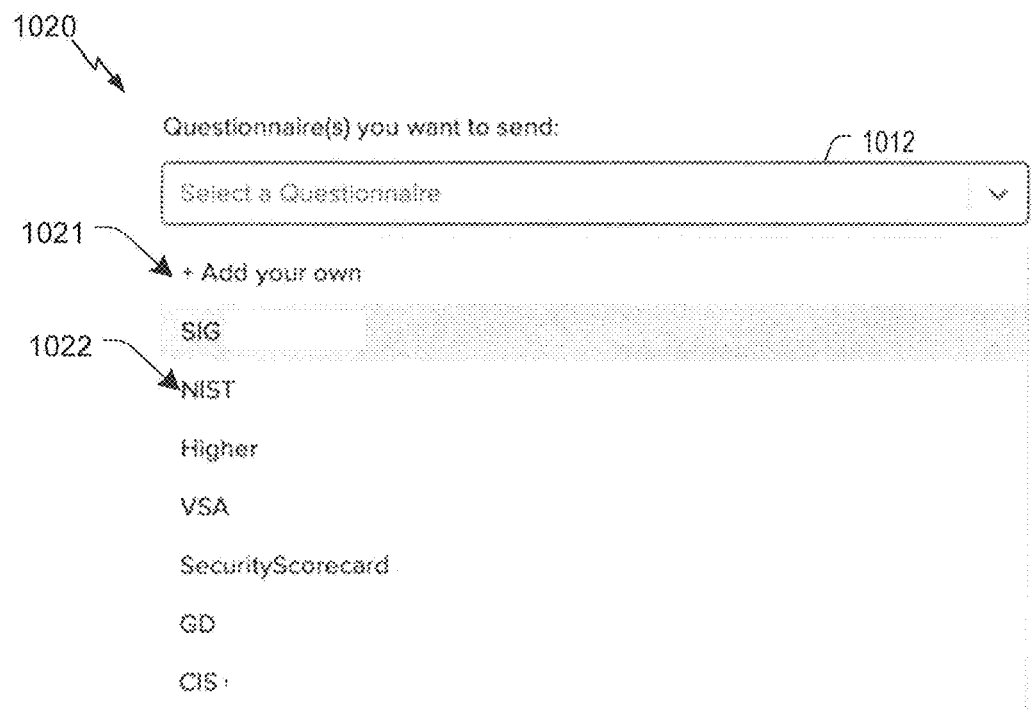

Referring to FIG. 10C, a third view including questionnaire selection options is shown and designated 1020. For example, the options may be presented responsive to selection of questionnaire field 1012. As shown, the options are presented as a drop down menu and include an option to add a new questionnaire 1021 or one or more options to select an existing questionnaire, such a representative questionnaire 1022. As shown, the options are presented as a drop down menu and include an option to add a new questionnaire 1021 or one or more options to select an existing questionnaire, such a representative questionnaire 1022. A new questionnaire that is added via add a new questionnaire 1021 may have a corresponding format and the file may be parsed based on selection of the new questionnaire. For example, the added questionnaire may include an Excel file, a CSV file, or another type of file. In some implementations, the existing questionnaire includes a preloaded questionnaire associated with a standard.

Figure 10D:
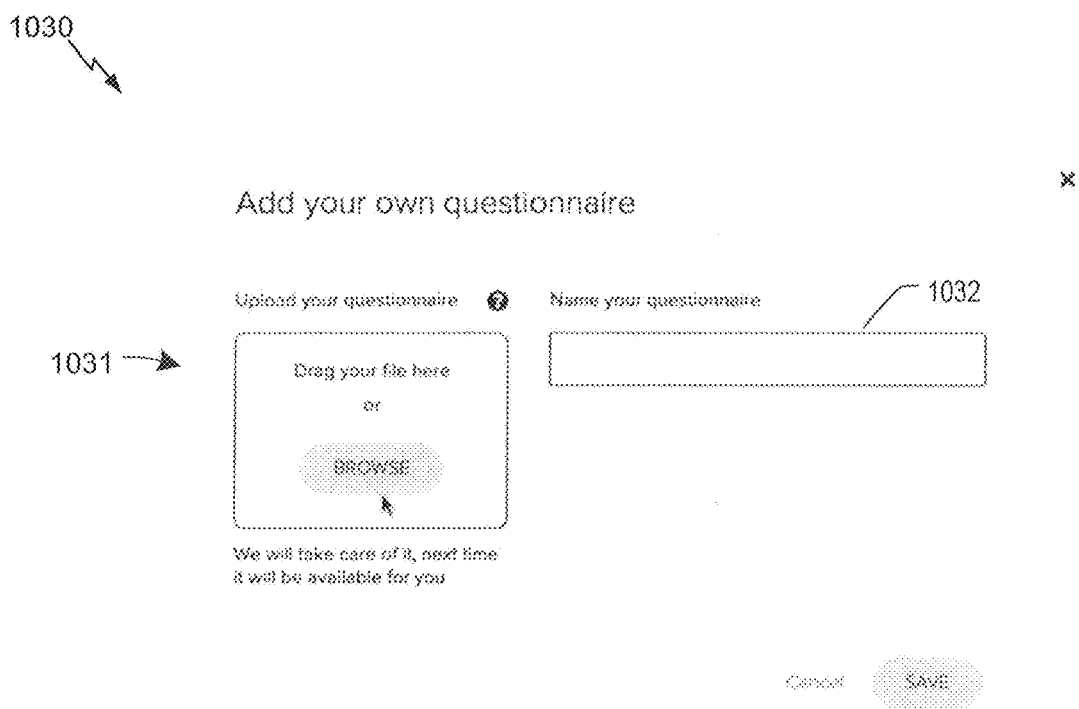
Figure 10E:
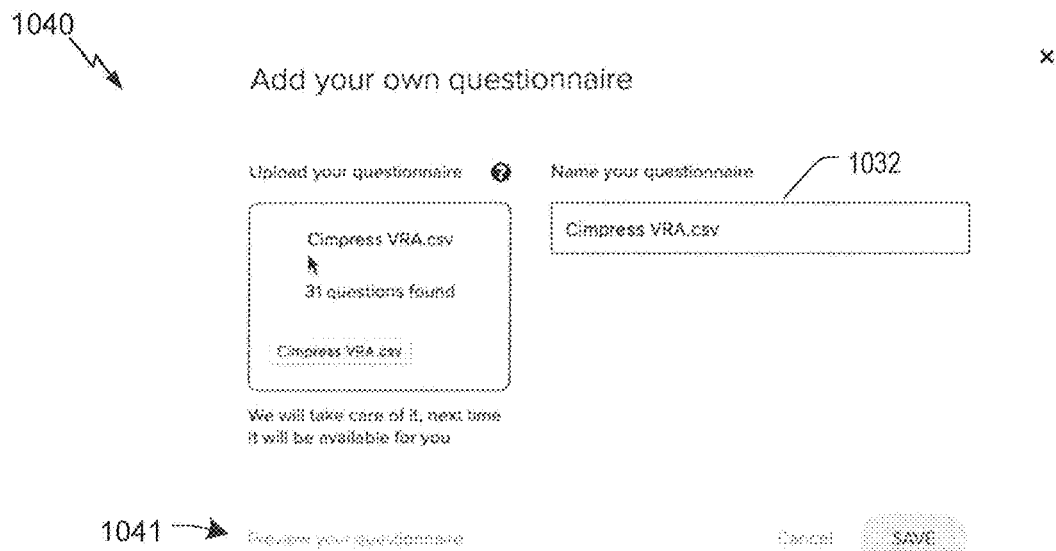

Referring to FIG. 10D, a fourth view presented responsive to selection of add a new questionnaire 1021 is shown and designated 1030. Fourth view 1030 includes options to add a file 1031 (e.g., drag-and-drop or browse) and name the questionnaire 1032. Referring to FIG. 10E, a fifth view is shown and designated 1040. Fifth view 1040 is a provided subsequent to fourth view 1030 and reflects the addition of a file (Cimpress VRA.csv) and population of questionnaire name. Based on selection of the new questionnaire, a number of questions within the new questionnaire is detected and/or response types of the questions are detected. As shown, the questionnaire has the name of the file; however, a user may modify the name via name the questionnaire 1032. After upload of the new questionnaire, an option to preview the questionnaire 1041 is presented.

Figure 10F:
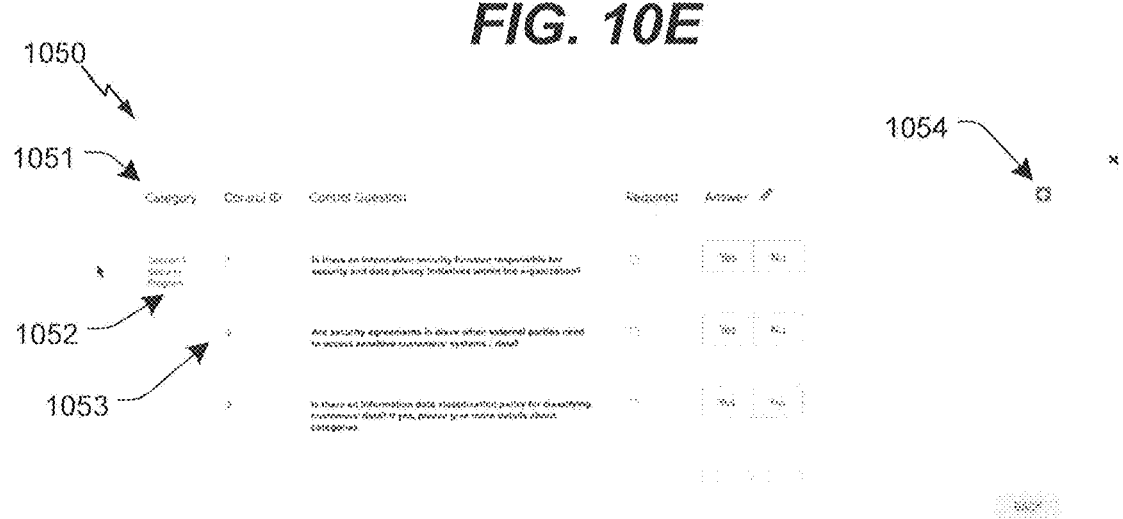
Figure 10G:
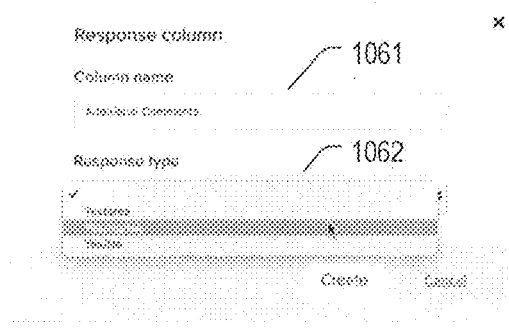

Referring to FIG. 10F, a sixth view presented responsive to selection of preview your questionnaire 1041 is shown and designated 1050. Sixth view 105 incudes a preview of the questionnaire, which may be modified. The preview includes headings, such as category (e.g., cybersecurity category), control ID, control question, required, answer (e.g., answer type), and an add option 1054. As shown, the preview also includes a listing of questions, such as first representative question 1052 and a second representative question 1053. For each question, input may be provided to indicate whether the question is required. Additionally, or alternatively, the preview enables question fields and/or columns to be added, removed, or edited. To illustrate, in response to selection of add option 1054, a column heading and field (for each question) may be added. For example, referring to FIG. 10G, a seventh view presented based on selection of add option 1054 is shown and designated 1060. Seventh view 1060 includes a column name field 1061 and a selectable response type field 1062.

Figure 10H:
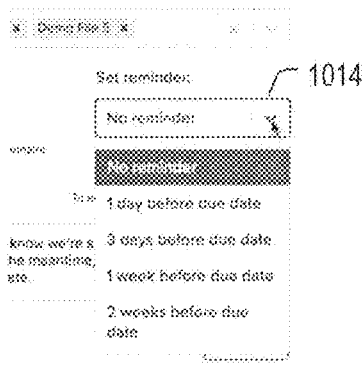

Referring to FIG. 10H, an eighth view presented responsive to selection of reminder field 1015 of FIG. 10B is shown and designated 1080. Eighth view 1080 provides a selectable option to send a notification to the questionnaire sender and/or recipient, such as a notification based on a determination that the questionnaire has yet to be completed.

Figure 10I:
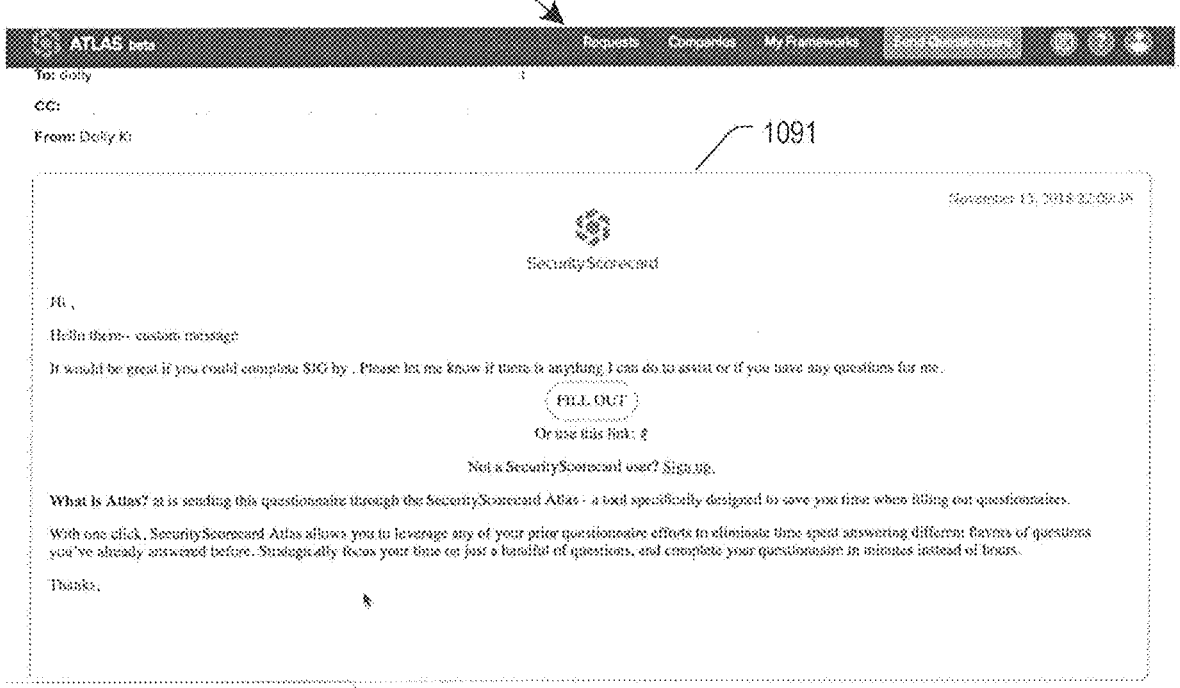

Referring to FIG. 10I, a ninth view presented responsive to selection of preview 1016 is shown and designated 1090. Ninth view 1090 shows a preview of a message that may be sent to a responder based on selection of send 1018 of FIG. 10B.

Figure 11A:
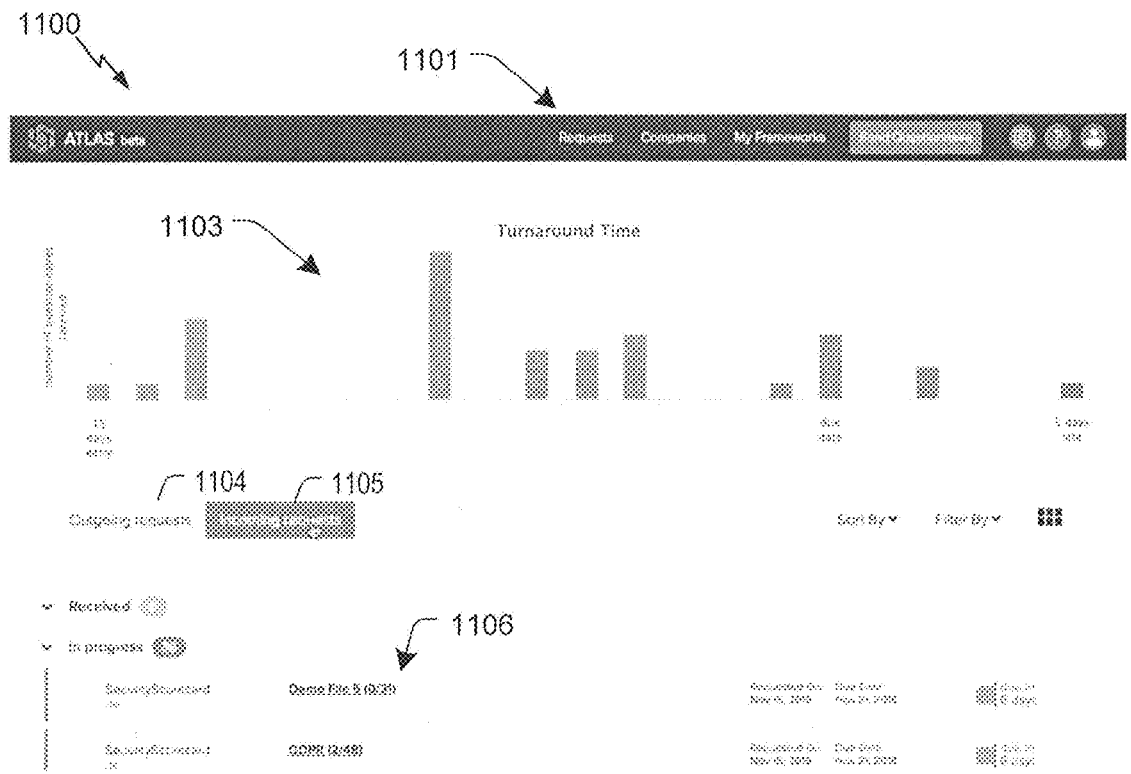
FIGS. 11A-11E illustrate examples of views associated with responding to a request form.

Referring to FIGS. 11A-11E, views presented to a second entity and associated with responding to a request form are shown. For example, the request (e.g., 1106) may include or correspond to the request described with reference to 10A-10I or with respect to a request form (e.g., 284). Referring to FIG. 11A, a first view of a dashboard is shown and designated 1100. The dashboard includes a set of selectable display options/features 1101 including a requests, companies, my frameworks, and send questionnaire. Based on selection of one of an outgoing requests option 1104 and an incoming requests option 1105, the visual representation 1103 presents a number outgoing requests associated with the first entity based on request due date of the outgoing requests or presents a number incoming requests associated with the first entity based on request due date of the incoming requests. To illustrate, visual representation 1103 of first view 1100 presents turnaround time for incoming requests option (e.g., 1105). Additionally first view 1100 also includes an indication/listing of received requests and a listing/indication of in progress requests, which includes request 1106.

Figure 11B:
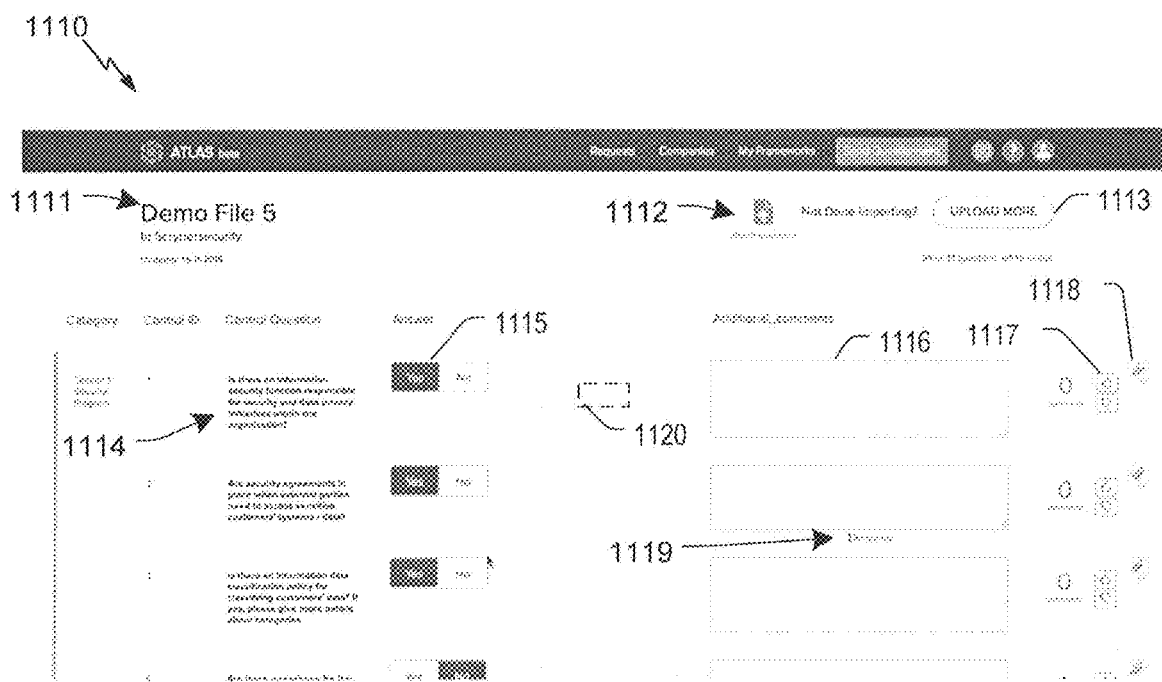

Referring to FIG. 11B, a second view presented responsive to selection of request 1106 is shown and designated 1110. Second view 1110 identifies a request identifier 1111 (corresponding to request 1106), an option to attach a file 1112 (e.g., evidence), and an option to upload a questionnaire, such as a questionnaire uploaded on behalf of the second entity that include one or more questions with responses. For example, the one or more questions with response may include at least one response that corresponds to the second entity. Second view 1110 also includes the one or more questions of request 1106, such as representative question 1114. As shown with reference to question 1114, second view 1110 includes a category identifier, a control number (e.g., a question number), a question, an answer 1115, a comments field 1116, a feedback indicator 1117, and an attachment option 1118. In some implementation, second view 1110 may include an option to assign a question, as indicated by dashed box 1120, to one or more individuals associated with the second entity. It is also noted that one or more questions may be indicated as required, as indicated by a representative required indicator 1119.

Regarding the second view 1110 presented based on request 1106, it is noted that upon the request 1106 being provided to the second entity, matching/mapping operations of questions of request 1106 was/were performed with respect to one or more other forms (e.g., 282, 284) for second entity. For example, the matching/mapping operations may be performed as described with reference to matcher module 253 and/or mapper module 254. Based on the matching/mapping operations, one or more questions of request 1106 may have answers that have been auto-populated—e.g., auto-populated by a machine learning engine that is able to take advantage of a previously filled out request. For example, the auto-population may have been performed by populater module 260. If additional clarification is needed with respect to question 1114, comment field 1116 may be selected and a comment may be provided that is sent to the sender (e.g., the first entity) of the request. To illustrate, the comment may be provided to (and responded to by first entity) within request 1106 in real-time.

Figure 11C:

Referring to FIG. 11C, a third view presented in response to selection of upload more 1113 is shown and designated 1125. For example, third view 1125 may be presented in response to receiving feedback from a comment. Third view 1125 includes a response field 1126 with a response to a comment provided via a comment field (e.g., 1116).

Figure 11D:
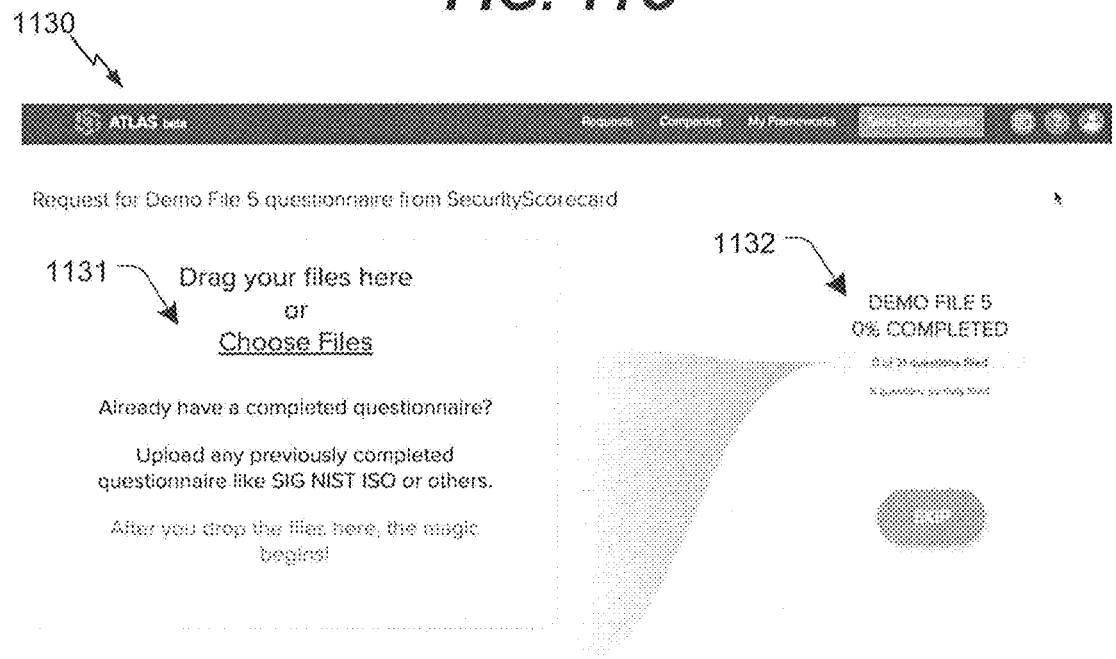

Referring to FIG. 11D, a fourth view presented responsive to selection of add a new questionnaire 1021 is shown and designated 1130. Fourth view 1130 includes an option 1131 to upload a questionnaire that has been at least partially filled out or completed. Fourth view 1130 also includes feedback indicator 1132 configured to provide feedback based on a questionnaire uploaded via option 1131. To illustrate, in response to uploading a file via option 1131, matching/mapping operations of the uploaded questionnaire to questions of request 1106 may be performed and an impact of the uploaded questionnaire (e.g., how many questions of request 1106 can be populated) may be indicated via feedback indicator 1132. For example a model may be generated based on one or more responses of the uploaded file and questions matched between the uploaded file and the request 1106. Additionally, or alternatively, in response to uploading a file via option 1131, matching/mapping operations of the uploaded questionnaire to questions to questions of one or more other forms (e.g., 282, 284) for second entity and feedback indicator 132 may indicate an impact of the uploaded questionnaire on the one or more other forms. Further, in response to matching/mapping operations, a conflict check operation may be performed to determine whether any answers of the uploaded questionnaire conflict with (and/or have different response types) of questions of request 1106, one or more other forms, or both. For example, the conflict check operation may be performed by conflict checker module 256. A result of the conflict check operation may be provided via feedback indicator 1132. In some implementations, a prompt may be provided to enable second entity to correct, track, and/or resolve one or more conflicts detected based on the conflict check operation.

Figure 11E:
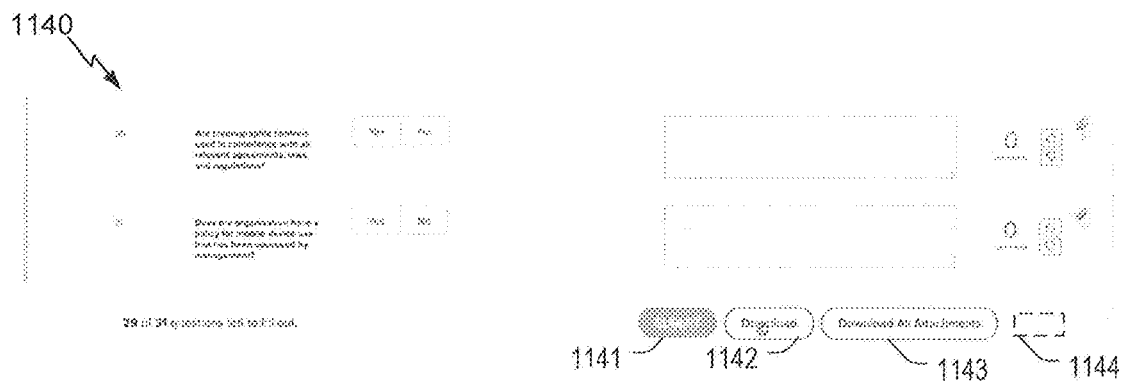

Referring to FIG. 11E, a fifth view is shown and designated 1140. Fifth view 1140 may include a portion of second view 1110. As shown, fifth view 1140 shows the last two questions of request 1106 and options that include a submit option 1141, a download option 1142, a download attachment option 1143. Submit option 1141 enables submission of request 1106 to the first entity (e.g., the sender). Download option 1141 enables request 1106 to be downloaded for completion. In some implementation, download option 1141 or another option (not shown) may enable request to be converted into a different format, such as an Excel format. Download attachment option 1143 enables one or more attachments associated with request 1106 to be downloaded for storage or further analysis (e.g., due diligence and/or auditing). In some implementations, fifth view 1140 (and/or second view 1110) may include an additional option, as indication by dashed box 1144. The additional option may enable a security check (of a cybersecurity risk level) to be performed on the responses included in request 1116. If any of the responses are determined to conflict with or not satisfy a security level, second entity may be notified via a prompt, flag, notification, etc. of the issue. In some implementations, a proposed corrective action may also be provided if any of the responses are determined to conflict with or not satisfy a security level.

Referring to FIGS. 12A-12B, views presented to the first entity after the second entity has submitted request 1106 are shown. For example, referring to FIG. 10A, a first view of a dashboard is shown and designated 1200. The dashboard includes a set of selectable display options/features 1201 including requests, companies, my frameworks, and send questionnaire. It is noted that first view 1200 corresponds to selection of requests from display options/features 1201. First view 120 indicates a status of different requests as "received", "in progress", "ready for review" 1202, or "accepted/closed". It is noted that ready for review 1202 includes request 1106 submitted by the second entity.

Referring to FIG. 12B, a second view presented responsive to selection of request 1106 from first view 1200 is shown and designated 1210. Second view 1210 includes a summary of responses 1211, a security rating 1214 (e.g., a cybersecurity rating) of the second entity, a send back option 1215 to send the request back to the second entity, an accept/complete option 1216 to designate the request 1106 as finished, a download option 1218 (e.g., 1142), and a download attachment option 1219 (e.g., 1143). The summary of responses 1211 indicates how may question have been completed and are in need of review and how many questions are incomplete. The summary 1211 also provides a breakdown of the completed questions to indicate how may question have been answered with Yes, No, or N/A. The summary also provides an indication of how many responses created a conflict with or do not satisfy a security level. For example, if a question of request 1106 asked "Do you apply critical patches in a timely manner?" and the answer provided was yes, but there were 10 patching cadence issues for the second entity, then the question would be flagged for review.

Referring to FIG. 13, a view of a dashboard is shown and designated 1300. The dashboard includes a set of selectable display options/features 1301 including requests, companies, my frameworks, and send questionnaire. It is noted that view 1300 corresponds to selection of my frameworks from display options/features 1201. The view 1300 shows a completion status of one or more forms of the first entity. It is noted that a first form 1302 and a second form 1303 are indicated as complete. It is further noted that one more of the forms, such as first form 1302, may correspond to a master form (e.g., 282) while the other forms are request forms (e.g., 284). Each of the request may include a selectable option, such as selectable option 1301. When selectable option 1301 is selected for a particular form, a view and/or information may be provided to indicate or show how the particular form impacts (e.g., populates) one or more of the other forms, how the particular form is impacted by one or more other forms, or both.

Referring to FIGS. 14A-14D, views presented to a first entity and associated with generation of a request form are shown. For example, referring to FIG. 14A, a first view of a dashboard is shown and designated 1400. The dashboard includes a set of selectable display options/features 1401 including requests, companies, my frameworks, and send questionnaire. It is noted that first view 1400 corresponds to selection of companies from display options/features 1201. First view 1400 provides a filter option 1402, a visual representation of a security rating of one or more entities that have exchanged forms (e.g., questionnaires/inquiries) with the first entity, and a listing of the one or more entities. For each entity, a security rating, a number—of sent forms, a number of received forms, and tags are indicated. For a particular entity, the tags may have been automatically populated and/or generated by the first entity. To illustrate, option 1404 enables first entity to provide an additional tag. Tags may be utilized to filter or sort the one or more entities and to classify (sort) a security risk of a company to one or low risk, medium risk, or high risk.

Figure 14A:
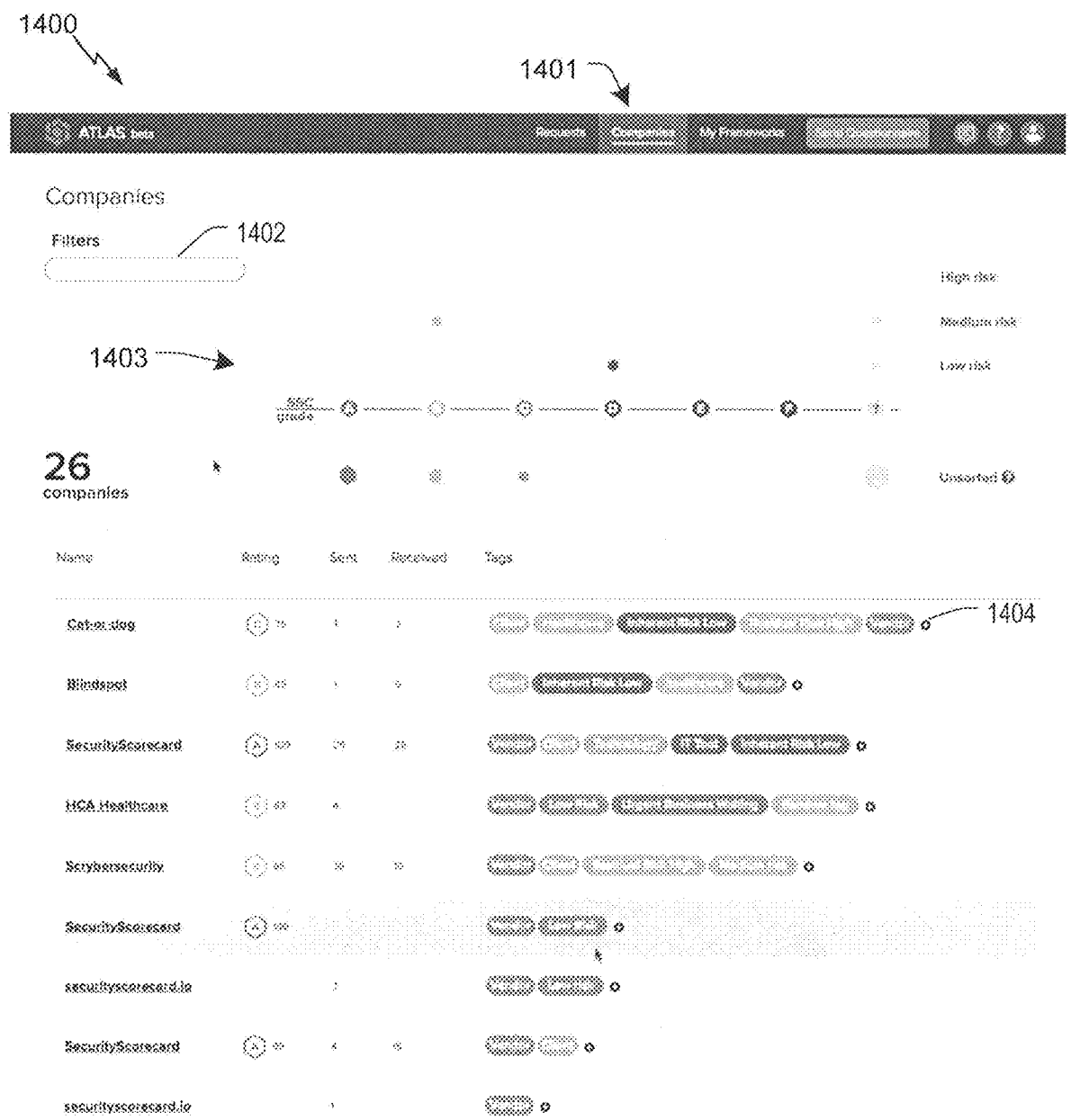
FIGS. 14A-14D examples of views of presentation of cybersecurity risk information.
Figure 14B:
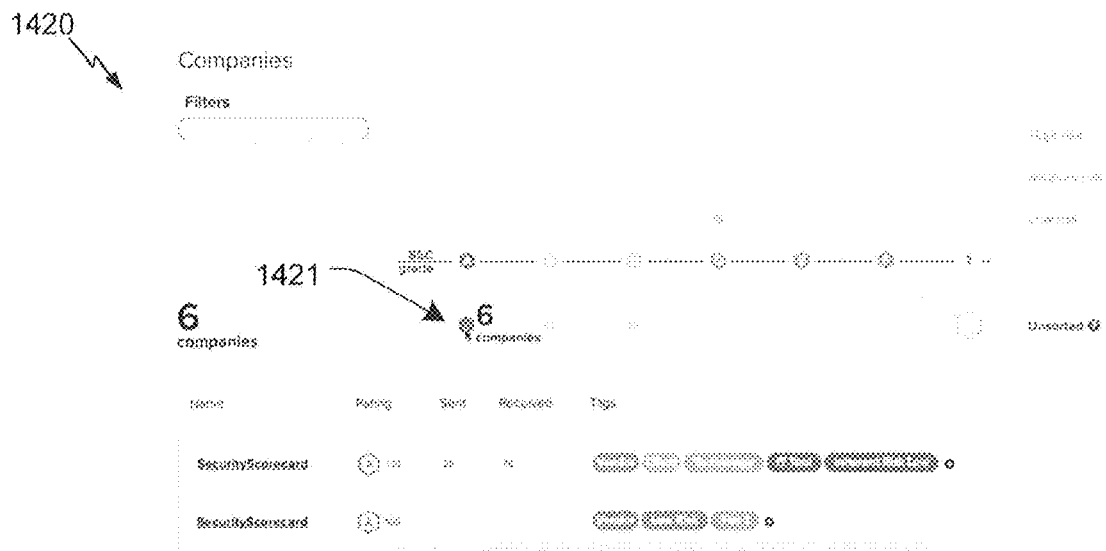
Figure 14C:
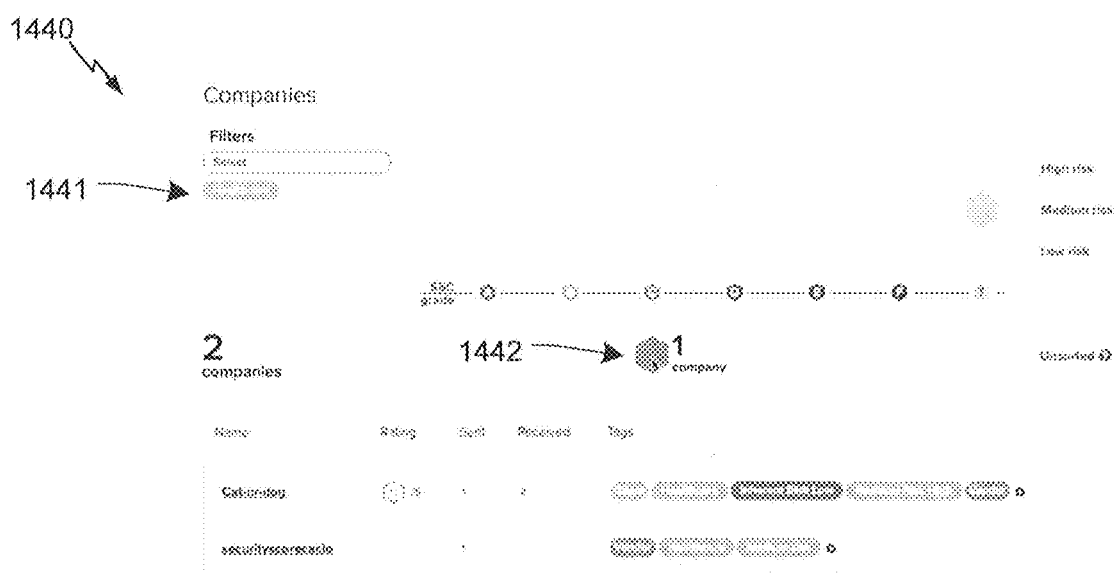
Figure 14D:
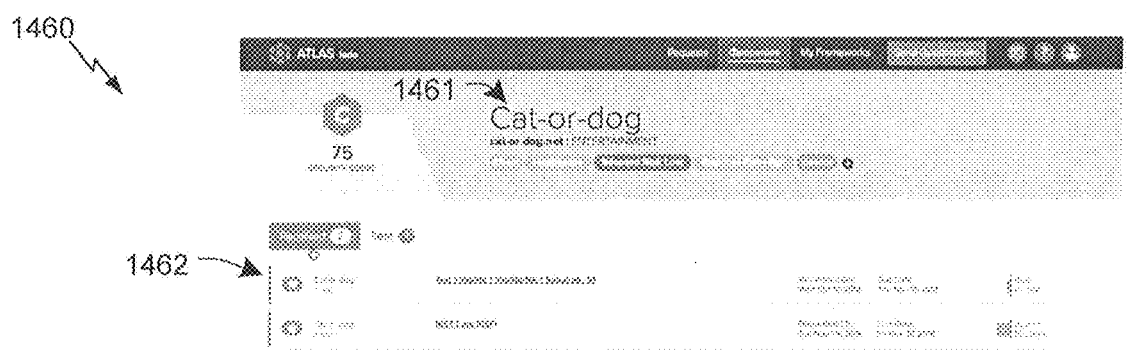

Referring to FIG. 14B, a second view presented responsive to a filter operation is shown and designated 1420. In second view 1420, an indicator 1421 of the visual representation has been selected to filter the listing of entities. Referring to FIG. 14C, a third view presented responsive to a filter operation is shown and designated 1440. Third view 1440 includes a tag 1441 used for the filter operation to filter the results of the visual representation and the list of entities. For example, at least one result 1442 (e.g., entity results) of the filter operation is identified in the filtered visual representation. Referring to FIG. 14D, a fourth view presented responsive to selection of a particular entity (e.g., a third entity) from first view 1400 or third view 1440 is shown and designated 1460. Fourth view 1460 includes a name 1461 of the third entity and a listing of one or more requests exchanged between the first entity and the third entity. For example, a representative request 1462 is identified. Selection of request 1462 may provide a view of the request. In some implementations, a risk for an entity may be provided for each entity as a selectable option included in the listing of one or more entities. Additionally, or alternatively, the fourth view 1460 may include one or more options to enable the first entity to access, for the third entity, a summary of history of questionnaires responded to, such as percentage of questions answered, number of security conflicts, etc.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining a cybersecurity risk level of an entity by mapping responses to a plurality of inquiry sets directed to the entity, the method comprising:
    performing at a computing device:
        modeling the responses to one or more inquiries in a first inquiry set of a plurality of inquiry sets and a degree of similarity between the one or more inquiries in the first inquiry set and one or more inquiries in a second inquiry set to predict responses from an entity to one or more inquiries in the second inquiry set;
        mapping, utilizing the prediction, responses from the entity to the one or more inquiries in the first inquiry set to the one or more inquiries in the second inquiry set;
        calculating a cybersecurity risk level of the entity using responses from the entity to one or more inquiries in the first inquiry set and the mapped responses; and
        generating an alert when a calculated overall cybersecurity risk score for the entity exceeds a threshold, the calculated overall cybersecurity risk score based at least in part on the calculated cybersecurity risk level of the entity.

2. The method of claim 1, further comprising:
    comparing the degree of similarity to a similarity threshold; and
    in response to a determination that the degree of similarity is greater than or equal to the similarity threshold, determining a detected match between the one or more inquiries in the first inquiry set and one or more inquiries in the second inquiry set of the plurality of inquiry sets.

3. The method of claim 1, further comprising:
    comparing the degree of similarity to a first similarity threshold; and
    in response to a determination that the degree of similarity is less than or equal to the first similarity threshold, comparing the degree of similarity to a second similarity threshold; and
    in response to a determination that the degree of similarity is greater than or equal to the second similarity threshold, generating a prompt for user input to indicate whether the one or more inquiries in the first inquiry set and the one or more inquiries in the second inquiry set are a match.

4. The method of claim 1, further comprising:
determining a second degree of similarity between the one or more inquiries in the first inquiry set and one or more inquiries in a third inquiry set of the plurality of inquiry sets;
comparing the second degree of similarity to a similarity threshold; and
in response to a determination that the degree of similarity is less than or equal to the similarity threshold, determining a mismatch between the one or more inquiries in the first inquiry set and one or more inquiries in the third inquiry set.

5. The method of claim 1, wherein the degree of similarity is determined using a machine learning component or a machine learning algorithm.

6. The method of claim 1, wherein the responses and the degree of similarity are modeled using a machine learning component or a machine learning algorithm.

7. The method of claim 1, wherein each inquiry set of the plurality of inquiry sets corresponds to a questionnaire.

8. The method of claim 1, further comprising:
reading, from a first inquiry set of a plurality of inquiry sets, responses from the entity to one or more inquiries in the first inquiry set.

9. The method of claim 1, further comprising:
determining the degree of similarity between one or more inquiries in a first inquiry set of the plurality of inquiry sets and one or more inquiries in a second inquiry set of the plurality of inquiry sets.

10. The method of claim 1, further comprising:
after mapping the responses from the entity to the one or more inquiries in the first inquiry set to the one or more inquiries in the second inquiry set, receiving a submission request from the entity to submit the second inquiry set;
identifying based on the second inquiry set, by one or more processors, a cybersecurity category of the second inquiry set; and
determining a level of cybersecurity of the entity for the cybersecurity category;
comparing the level of cybersecurity with the mapped responses;
notifying the entity of a discrepancy between the level of cybersecurity with the mapped responses; and
prompting the entity to modify the mapped responses.

11. The method of claim 10, further comprising:
identifying, by the one or more processors, a cybersecurity category of a first inquiry of the second inquiry set.

12. The method of claim 11, wherein the cybersecurity category comprises a social networking category, data security and information lifecycle management category, a malware and botnet infections category, an application vulnerabilities category, application and interface security category, a breach history category, a network exploits category, a domain name system (DNS) health category, a patching cadence category, a leaked employee credentials category, identity and access management category, encryption and key management category, or audit assurance and compliance category.

13. The method of claim 1, further comprising:
generating a graphical user interface (GUI) via which a visual representation is presented that indicates the first inquiry was provided to the entity, the visual representation comprises, for the entity, an indication of a cybersecurity rating, an industry cybersecurity percentile ranking, an indication of a number of inquiry sets sent to the entity for response, an indication of a number of inquiry sets sent from the entity for response, one or more tag, or a combination thereof;
receiving a selection, via the visual representation, of the entity; and
generating a second visual representation that indicates information associated with each inquiry sent from another particular entity to the entity for response, information associated with each inquiry sent from the entity to the other particular entity for response, or both.

14. The method of claim 1, further comprising:
generating a graphical user interface (GUI) via which a visual representation is presented that indicates the first inquiry set was provided to the entity;
receiving a filter input associated with the visual representation; and
in response to the filter input, modifying the visual representation to depict one or more relationships, based on the filtered input, between another entity and a plurality of other entities including the entity.

15. A system for populating data sets indicative of risk level of a first entity having a relationship with a second entity, the system comprising:
a memory; and
one or more processors coupled to the memory, the one or more processors configured to:
map, based on one or more inquiries in a first inquiry set of a plurality of inquiry sets and a degree of similarity between the one or more inquiries in the first inquiry set and one or more inquiries in a second inquiry set, responses from an entity to the one or more inquiries in the first inquiry set to the one or more inquiries in the second inquiry set;
calculate a cybersecurity risk level of the entity using responses from the entity to one or more inquiries in the first inquiry set and the mapped responses; and
based on the calculated cybersecurity risk level:
notify a user of the entity of the cybersecurity risk level;
provide a recommendation of one or more corrective actions to lower the cybersecurity risk level; or
a combination thereof.

16. The system of claim 15, wherein the one or more processors are further configured to:
calculate an overall cybersecurity risk score for the entity based, at least in part, on the calculated cybersecurity risk level of the entity.

17. The system of claim 16, wherein the one or more processors are further configured to:
compare the calculated cybersecurity risk level to a cybersecurity threshold;
classify the entity as high risk; and
generate an alert when the calculated overall cybersecurity risk score exceeds the cybersecurity threshold.

18. The system of claim 15, wherein the one or more processors are further configured to:
determine an industry cybersecurity percentile ranking for the entity based on the calculated cybersecurity risk level of the entity.

19. The system of claim 15, wherein the one or more processors are further configured to:
classify the entity as high risk, medium risk, or low risk based on the calculated cybersecurity risk level.

20. The system of claim 15, wherein the one or more processors are further configured to:
based on the calculated cybersecurity risk level:

notify the user of the entity of the cybersecurity risk level; and provide the recommendation of the one or more corrective actions to lower the cybersecurity risk level.

21. The system of claim 15, wherein the one or more processors are further configured to:

aggregate the calculated cybersecurity risk level with cybersecurity risk levels of other entities in the same industry as the entity to calculate an aggregated calculated risk level for the industry; and initiate presentation of a representation of the aggregated calculated risk level for the industry.

22. The system of claim 15, wherein the entity is a vendor of a plurality of vendors for a company.

23. The system of claim 22, wherein the one or more processors are further configured to:

aggregate the calculated cybersecurity risk level with cybersecurity risk levels of other vendors of the plurality of vendors to calculate an aggregated calculated risk level for vendors for the company; and initiate presentation of a representation of the aggregated calculated risk level for the vendors.

24. The system of claim 23, wherein the one or more processors are further configured to:

assign a cybersecurity risk level to the company based on the aggregated calculated risk level for vendors for the company; and initiate presentation of a representation of the aggregated calculated risk level for the vendors, the presentation of the representation comprises display of a visual representation via a display, output of an audio representation via a speaker, or both.

25. A non-transitory computer-readable storage medium storing instructions that, when executed by one or more processors, cause the one or more processors to perform operations for mapping responses to a plurality of inquiry sets directed to an entity, the operations comprising:

modeling the responses to one or more inquiries in a first inquiry set of a plurality of inquiry sets and a degree of similarity between the one or more inquiries in the first inquiry set and one or more inquiries in a second inquiry set to predict responses from an entity to one or more inquiries in the second inquiry set;

mapping, utilizing the prediction, responses from the entity to the one or more inquiries in the first inquiry set to the one or more inquiries in the second inquiry set; and prompting the entity to modify the mapped responses, or notifying the entity of a discrepancy between the mapped responses and a cybersecurity level of the entity for a cybersecurity category, or a combination thereof.

26. The non-transitory computer-readable storage medium of claim 25, wherein the instructions that, when executed by the one or more processors, cause the one or more processors to perform the operations further comprising:

receiving an upload of the first inquiry set; and initiating display of a result of modeling the responses.

27. The non-transitory computer-readable storage medium of claim 26, wherein the instructions that, when executed by the one or more processors, cause the one or more processors to perform the operations further comprising:

receiving an input to initiate mapping the responses.

28. The non-transitory computer-readable storage medium of claim 27, wherein the instructions that, when executed by the one or more processors, cause the one or more processors to perform the operations further comprising:

generating one or more graphical user interfaces (GUIs) via which the first inquiry set is uploaded, the result of the modeling is displayed, the input to initiate mapping the response is received, or a combination thereof.

29. The non-transitory computer-readable storage medium of claim 25, wherein the instructions that, when executed by the one or more processors, cause the one or more processors to perform the operations further comprising:

receiving an upload of a third inquiry set;

reading, from the third inquiry set, one or more responses from the entity to one or more inquiries in the third inquiry set; and determining a degree of similarity between the one or more inquiries in the third inquiry set and the one or more inquiries in the second inquiry set.

30. The non-transitory computer-readable storage medium of claim 25, wherein the instructions that, when executed by the one or more processors, cause the one or more processors to perform the operations further comprising:

calculating a cybersecurity risk level of the entity using responses from the entity to one or more inquiries in the first inquiry set and the mapped responses.

* * * * *

UNITED STATES PATENT AND TRADEMARK OFFICE
CERTIFICATE OF CORRECTION

| | |
|---|---|
| PATENT NO. | : 11,275,843 B2 |
| APPLICATION NO. | : 16/703464 |
| DATED | : March 15, 2022 |
| INVENTOR(S) | : Samuel Kassoumeh et al. |

Page 1 of 1

It is certified that error appears in the above-identified patent and that said Letters Patent is hereby corrected as shown below:

In the Specification

At Column 18, Line number 16, delete "0.01" and replace with --D.01--.
At Column 22, Line number 19, delete "tilling" and replace with --filling--.

Signed and Sealed this
Tenth Day of May, 2022

Katherine Kelly Vidal
*Director of the United States Patent and Trademark Office*